US012548528B2

(12) United States Patent
Chappalli et al.

(10) Patent No.: US 12,548,528 B2
(45) **Date of Patent: *Feb. 10, 2026**

(54) SYSTEMS AND METHODS FOR TWO-DIMENSIONAL BACKLIGHT OPERATION

(71) Applicant: Apple Inc., Cupertino, CA (US)

(72) Inventors: Mahesh B. Chappalli, San Jose, CA (US); Assaf Menachem, Hod Hasharon (IL); Daniel Yechiel Dar, Givatayim (IL); Ido Yaacov Soffair, Tel-Aviv (IL)

(73) Assignee: Apple Inc., Cupertino, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/642,765

(22) Filed: Apr. 22, 2024

(65) Prior Publication Data

US 2024/0339086 A1 Oct. 10, 2024

Related U.S. Application Data

(63) Continuation of application No. 17/357,868, filed on Jun. 24, 2021, now Pat. No. 11,967,290.

(Continued)

(51) Int. Cl.
*G09G 3/34* (2006.01)
*G09G 3/36* (2006.01)

(52) U.S. Cl.
CPC ............. *G09G 3/3426* (2013.01); *G09G 3/36* (2013.01); *G09G 2320/0233* (2013.01);
(Continued)

(58) Field of Classification Search
CPC ................... G09G 3/3426; G09G 3/36; G09G 2320/0233; G09G 2320/0247;
(Continued)

(56) References Cited

U.S. PATENT DOCUMENTS 7,477,228 B2 1/2009 Wyatt
7,671,901 B2 * 3/2010 Masuda ................ H04N 9/643 348/226.1

(Continued)

FOREIGN PATENT DOCUMENTS

CN 101425275 A 5/2009
CN 102422342 A 4/2012

(Continued)

OTHER PUBLICATIONS

Korean Search Report for Korean Patent Application No. 10-2023-7012170 dated May 1, 2023, 20 pages.

(Continued)

*Primary Examiner* — Michael J Jansen, II
(74) *Attorney, Agent, or Firm* — Fletcher Yoder, P.C.

(57) ABSTRACT

An electronic display device has a panel that operates in conjunction with a light-emitting diode (LED) backlight. The device “slopes” or gradually ramps a change in brightness of an LED based on a target brightness value of the LED, a current brightness value of the LED, and temperature at the LED. The device also may limit power to the backlight based on an estimated power consumption of a current row of LEDs of the backlight and power consumption of the other rows of LEDs. The device also may determine a reduced voltage to supply to an LED based on a current to supply to the LED to cause the LED to operate. The device also may send an interrupt to the backlight to block updates to the backlight while image content is written to pixels of the panel. The device further compensates for aging of and temperature at an LED.

20 Claims, 11 Drawing Sheets

Related U.S. Application Data

(60) Provisional application No. 63/078,281, filed on Sep. 14, 2020.

(52) U.S. Cl.
CPC ............... *G09G 2320/0247* (2013.01); *G09G 2320/041* (2013.01); *G09G 2320/043* (2013.01); *G09G 2320/046* (2013.01); *G09G 2320/0653* (2013.01); *G09G 2330/021* (2013.01)

(58) Field of Classification Search
CPC ....... G09G 2320/041; G09G 2320/043; G09G 2320/046; G09G 2320/0653; G09G 2330/021
See application file for complete search history.

(56) References Cited

U.S. PATENT DOCUMENTS

| | | | | |
|---|---|---|---|---|
| 7,764,252 | B2 | 7/2010 | Miller et al. | |
| 8,569,910 | B2 * | 10/2013 | Dunn | H05B 45/24 307/31 |
| 8,736,543 | B2 | 5/2014 | Kubota et al. | |
| 8,786,589 | B2 * | 7/2014 | Park | G09G 3/3225 345/76 |
| 8,823,614 | B2 | 9/2014 | Lee | |
| 8,836,735 | B2 | 9/2014 | Fujiwara et al. | |
| 8,884,866 | B2 | 11/2014 | Chen et al. | |
| 9,013,771 | B2 * | 4/2015 | Park | H04N 9/73 358/1.9 |
| 9,135,889 | B2 | 9/2015 | Marcu et al. | |
| 9,165,493 | B2 | 10/2015 | Marcu et al. | |
| 9,262,965 | B2 | 2/2016 | Chaji et al. | |
| 9,324,279 | B2 | 4/2016 | Fujiwara et al. | |
| 9,442,562 | B2 * | 9/2016 | Atkins | G06F 3/011 |
| 9,548,017 | B2 * | 1/2017 | Tada | G09G 3/2003 |
| 9,711,093 | B2 | 7/2017 | Fujiwara et al. | |
| 9,812,071 | B2 | 11/2017 | Matsui | |
| 10,237,547 | B1 | 3/2019 | Wu et al. | |
| 10,242,628 | B2 | 3/2019 | Lee et al. | |
| 10,311,807 | B2 * | 6/2019 | Chen | G09G 3/36 |
| 10,504,453 | B1 | 12/2019 | Jung et al. | |
| 10,504,487 | B2 | 12/2019 | Jung et al. | |
| 10,571,744 | B1 | 2/2020 | Chang et al. | |
| 10,588,190 | B2 * | 3/2020 | Beij | H05B 45/395 |
| 10,614,750 | B2 | 4/2020 | Drzaic | |
| 10,643,549 | B1 | 5/2020 | Jung et al. | |
| 10,714,028 | B2 | 7/2020 | Chen et al. | |
| 10,928,881 | B2 | 2/2021 | Syed et al. | |
| 10,964,275 | B2 | 3/2021 | Petrovich et al. | |
| 11,468,854 | B2 * | 10/2022 | Calayir | G09G 3/282 |
| 11,798,501 | B2 | 10/2023 | Tu et al. | |
| 11,810,523 | B2 | 11/2023 | Jeon et al. | |
| 11,967,290 | B2 * | 4/2024 | Chappalli | G09G 3/2092 |
| 2005/0134547 | A1 | 6/2005 | Wyatt | |
| 2005/0201617 | A1 | 9/2005 | Park et al. | |
| 2006/0001641 | A1 | 1/2006 | Degwekar et al. | |
| 2006/0103643 | A1 | 5/2006 | Mathew et al. | |
| 2006/0215044 | A1 * | 9/2006 | Masuda | H04N 9/68 348/E9.04 |
| 2007/0146252 | A1 | 6/2007 | Miller et al. | |
| 2008/0069478 | A1 | 3/2008 | Ohwaki et al. | |
| 2009/0109165 | A1 | 4/2009 | Park et al. | |
| 2010/0091039 | A1 | 4/2010 | Marcu et al. | |
| 2010/0237697 | A1 * | 9/2010 | Dunn | G09G 3/3406 307/31 |
| 2011/0032275 | A1 | 2/2011 | Marcu et al. | |
| 2011/0134091 | A1 | 6/2011 | Chen et al. | |
| 2011/0273488 | A1 | 11/2011 | Fujiwara et al. | |
| 2011/0292018 | A1 | 12/2011 | Kubota et al. | |
| 2011/0298782 | A1 | 12/2011 | Park | |
| 2012/0032995 | A1 | 2/2012 | Lee | |
| 2012/0299817 | A1 | 11/2012 | Atkins et al. | |
| 2012/0299891 | A1 * | 11/2012 | Fujiwara | G09G 3/3426 345/212 |
| 2012/0306942 | A1 | 12/2012 | Fujiwara et al. | |
| 2013/0044272 | A1 | 2/2013 | Gao | |
| 2013/0141351 | A1 | 6/2013 | Aisaka et al. | |
| 2014/0043316 | A1 | 2/2014 | Chaji et al. | |
| 2015/0103105 | A1 | 4/2015 | Kim et al. | |
| 2016/0005342 | A1 | 1/2016 | Park | |
| 2016/0086551 | A1 | 3/2016 | Matsui et al. | |
| 2016/0240126 | A1 | 8/2016 | Tada et al. | |
| 2017/0323602 | A1 | 11/2017 | Krause et al. | |
| 2018/0088733 | A1 | 3/2018 | Syed et al. | |
| 2018/0108327 | A1 * | 4/2018 | Jung | G09G 5/026 |
| 2018/0204529 | A1 | 7/2018 | Chen | |
| 2018/0336846 | A1 | 11/2018 | Lee et al. | |
| 2018/0376557 | A1 * | 12/2018 | Beij | H05B 45/14 |
| 2019/0221157 | A1 * | 7/2019 | Drzaic | G09G 3/30 |
| 2020/0090599 | A1 | 3/2020 | Calayir et al. | |
| 2020/0105185 | A1 | 4/2020 | Chen et al. | |
| 2020/0335047 | A1 | 10/2020 | Petrovich et al. | |
| 2021/0335288 | A1 | 10/2021 | Jeon et al. | |
| 2022/0068227 | A1 | 3/2022 | Tu et al. | |
| 2022/0084477 | A1 | 3/2022 | Chappalli et al. | |
| 2022/0189381 | A1 | 6/2022 | Hunt | |

FOREIGN PATENT DOCUMENTS

| | | | |
|---|---|---|---|
| JP | 2002311413 | A | 10/2002 |
| JP | 2006267140 | A | 10/2006 |
| JP | 2009163172 | A | 7/2009 |
| JP | 2011196339 | A | 10/2011 |
| JP | 2013257434 | A | 12/2013 |
| JP | 2018518024 | A | 7/2018 |
| KR | 10-20080022798 | A | 3/2008 |
| KR | 10-20150043652 | A | 4/2015 |
| WO | 201104948 | A1 | 6/2013 |

OTHER PUBLICATIONS

International Search Report & Written Opinion for PCT Application No. PCT/US2021/050110 dated Nov. 23, 2021.

* cited by examiner

SYSTEMS AND METHODS FOR TWO-DIMENSIONAL BACKLIGHT OPERATION

CROSS-REFERENCE TO RELATED APPLICATION

This application is a continuation of U.S. application Ser. No. 17/357,868, filed Jun. 24, 2021, which claims the benefit of U.S. Provisional Application No. 63/078,281, entitled "SYSTEMS AND METHODS FOR TWO-DIMENSIONAL BACKLIGHT OPERATION," filed Sep. 14, 2020, each of which is hereby incorporated by reference in its entirety for all purposes.

BACKGROUND

The present disclosure relates generally to electronic displays, and more particularly, to backlights of the electronic displays.

This section is intended to introduce the reader to various aspects of art that may be related to various aspects of the present disclosure, which are described and/or claimed below. This discussion is believed to be helpful in providing the reader with background information to facilitate a better understanding of the various aspects of the present disclosure. Accordingly, it should be understood that these statements are to be read in this light, and not as admissions of prior art.

Some electronic displays may include a liquid crystal display (LCD) panel that uses the light-modulating properties of liquid crystals combined with polarizers and/or color filters to cause light passing through the panel to appear as different colors and hues. The light may be provided by a backlight made up of, for example one or more light-emitting diodes (LEDs). In some cases, the backlight may include rows and columns of light source elements (e.g., LEDs), referred to as a two-dimensional (2D) backlight. At times, in operation, brightness of an LED of the backlight may be increased or decreased sharply (e.g., based on image content or a change in brightness setting). However, this sharp change in brightness, over time, may result in a change of operation of the LED, which may cause noticeable artifacts in the display. Additionally, the backlight may consume a variable amount of power depending on image content to be displayed on different parts of a display. If excessive power is consumed by the backlight, a voltage drop may occur that causes display circuitry to behave undesirably.

Moreover, the LEDs may operate when supplied with a current and a voltage. In particular, the current for an LED may be supplied based on a desired brightness for the LED, which may be dependent on image content. Supplying at least a threshold voltage to the LED, which may vary based on the supplied current, may cause the LED to be operable (e.g., emit light). One way to ensure that all LEDs of the backlight are operable is to supply a relatively high voltage to all LEDs to ensure that the supplied voltage is greater than the variable threshold voltage level. However, supplying these higher voltages may inefficiently consume excess power.

Furthermore, the backlight may be updated based on changes in image content. For example, a zero-dimensional (0D) backlight, which may provide a generally uniform amount of light across an entire frame, may be updated once per new frame of image content. Thus, a 0D backlight may operate asynchronously to the LCD panel that it illuminates.

A 2D backlight, however, may update while some pixel rows of the LCD panel are being written or are settling, which could produce image artifacts such as flickering or shimmering.

Also, a 0D backlight may age in a predictable way based on its operation over time, since it uses a single light source. The more the backlight is operated, as well as the higher the temperature of operation, the more the backlight may age. For a 2D backlight that is made up of multiple light sources (e.g., LEDs), aging may vary over time based on the content that the backlight illuminates, the different temperatures each LED is exposed to (e.g., as produced by neighboring components that may be different for each LED), and so on. As such, a "burn-in" effect may arise due to uneven aging of a 2D backlight, resulting in poorer display quality.

SUMMARY

A summary of certain embodiments disclosed herein is set forth below. It should be understood that these aspects are presented merely to provide the reader with a brief summary of these certain embodiments and that these aspects are not intended to limit the scope of this disclosure. Indeed, this disclosure may encompass a variety of aspects that may not be set forth below.

Systems and methods are disclosed that include electronic displays having a panel (e.g., a liquid crystal display (LCD) panel) that operates in conjunction with a backlight (e.g., a two-dimensional (2D) backlight). The backlight may include one or more light sources, such as light-emitting diodes (LEDs), which cause light to emit through the panel, which causes the light to appear as different desired colors and hues.

The system and methods may "slope" or a gradually ramp a change in brightness of an LED. In particular, a current brightness value and a target brightness value of the LED may be received, and a sloped or intermediate brightness may be interpolated based on the current brightness value and the target brightness value. In some cases, the sloped brightness may also be determined based on a temperature at the LED for greater accuracy. In this manner, sharp changes in brightness of the LED may be avoided or reduced, thus preventing or lessening noticeable artifacts in a display.

The system and methods may also limit or reduce power to the backlight based on a target brightness of a current row of LEDs of the backlight and power consumption of the other rows of LEDs of the backlight. In particular, power consumption (e.g., present power consumption) of the other rows of LEDs of the backlight may be stored, and power consumption for the current row of LEDs to emit the target brightness may be estimated. If the sum of these power consumptions is greater than a threshold power consumption, then the power supplied to all of the LEDs may be scaled down as to not exceed the threshold power consumption. In this manner, power delivery may be properly maintained, and a likelihood of voltage drop may be reduced or avoided.

The system and methods may further determine a reduced or minimum voltage to supply to an LED based on a current to supply to the LED to cause the LED to operate. The current may cause the LED to emit a desired brightness based on, for example, image content and/or a display brightness setting. The current and reduced voltage may then be supplied to the LED to operate the LED and cause the LED to emit the desired brightness. The reduced voltage may be less than a default, relatively high voltage that is uniformly supplied to all the LEDs of the backlight to ensure that the LEDs are all operable. In this manner, power may be conserved when operating the backlight.

The system and methods may also "stagger" updating the backlight, such that updating the backlight is synchronized with refreshing pixels of the LCD panel to optimize or increase image quality and reduce or minimize display flicker. In particular, updating the backlight may be performed on a row-by-row or group-by-group basis of the LEDs of the backlight in coordination with an LCD scan pattern of the panel. That is, to stagger updating the backlight, an interrupt may be sent to the backlight to block updates to the one or more LED rows of the backlight (e.g., corresponding to displaying a new image frame) while image content of the new image frame is written to pixels of the display panel. Once the image content has been written to the pixels, and the pixels have settled, then the interrupt may be canceled. The one or more LED rows of the backlight may then be updated. In this manner, the backlight may be prevented from changing while image content is written to the display panel, reducing image artifacts on the display.

The system and methods may further compensate for aging of and temperature at an LED. In particular, periodic compensation factors may be determined over time that compensate for aging and temperature of the LED. These compensation factors may be combined to determine a compensation factor, and current may be supplied to the LED based on the compensation factor. In this manner, display abnormalities, such as "burn-in" effects, may be avoided or reduced, resulting in better display quality.

It should be understood that any or all of the disclosed systems and methods may be combined together. That is, the disclosed systems and methods may include electronic displays having LCD panels that operate in conjunction with 2D LED backlights that "slope" or gradually ramp a change in brightness of an LED, limit power to the backlight based on a target brightness of a current row of LEDs and power consumption of the other rows of LEDs, determine a reduced voltage to supply to an LED to cause the LED to operate based on a current to supply to the LED, stagger updating the backlight to block updates to the backlight while image content is written to pixels of the LCD panel, and/or compensate for aging of and temperature at an LED.

Various refinements of the features noted above may exist in relation to various aspects of the present disclosure. Further features may also be incorporated in these various aspects as well. These refinements and additional features may exist individually or in any combination. For instance, various features discussed below in relation to one or more of the illustrated embodiments may be incorporated into any of the above-described aspects of the present disclosure alone or in any combination. The brief summary presented above is intended to familiarize the reader with certain aspects and contexts of embodiments of the present disclosure without limitation to the claimed subject matter.

BRIEF DESCRIPTION OF THE DRAWINGS

Various aspects of this disclosure may be better understood upon reading the following detailed description and upon reference to the drawings in which.

DETAILED DESCRIPTION

Figure 1:
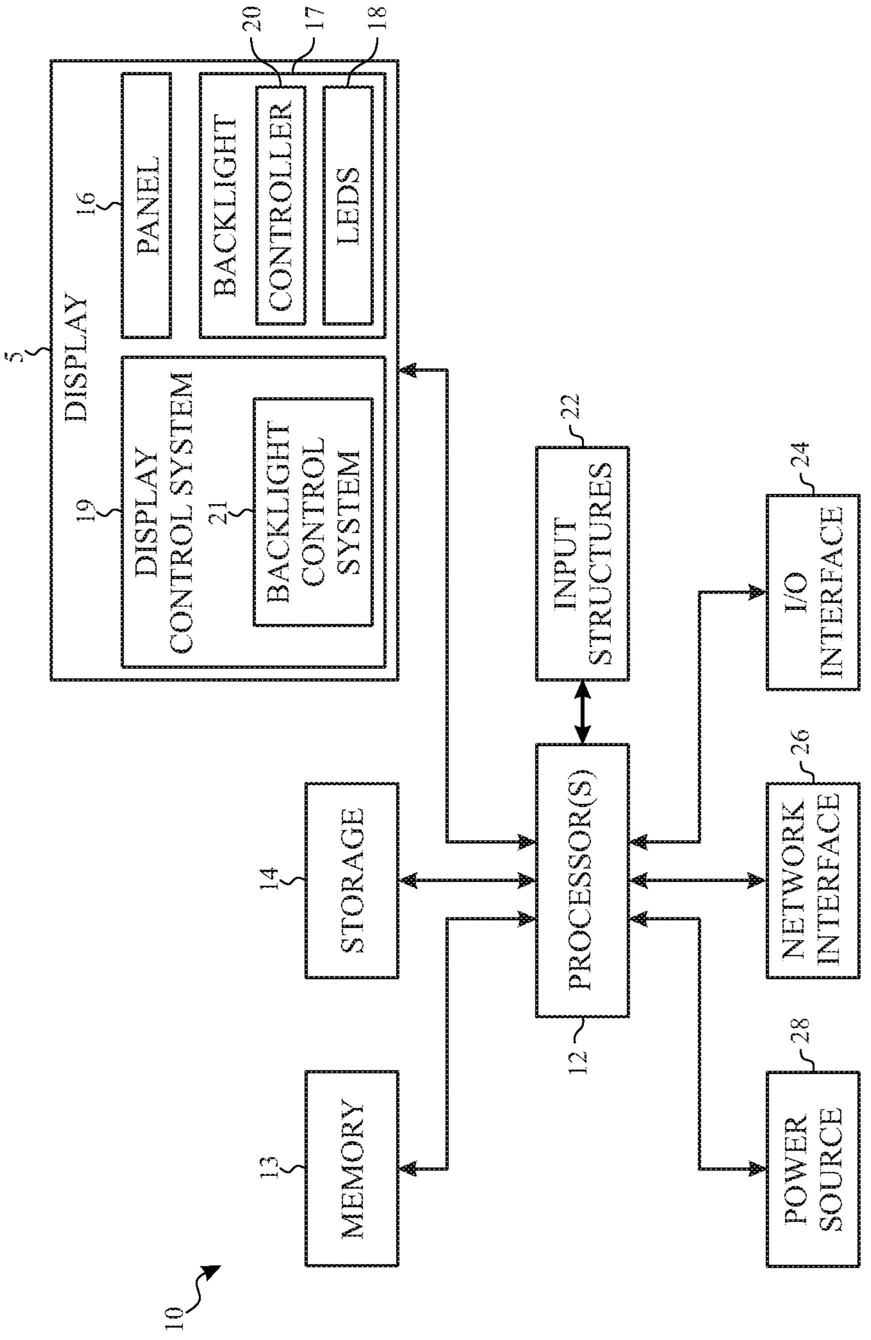
FIG. 1 is a schematic block diagram of an electronic device including a transceiver, in accordance with an embodiment of the present disclosure.

One or more specific embodiments of the present disclosure will be described below. These described embodiments are examples of the presently disclosed techniques. Additionally, in an effort to provide a concise description of these embodiments, all features of an actual implementation may not be described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time-consuming, but would nevertheless be a routine undertaking of design, fabrication, and manufacture for those of ordinary skill having the benefit of this disclosure.

When introducing elements of various embodiments of the present disclosure, the articles "a," "an," and "the" are intended to mean that there are one or more of the elements. The terms "comprising," "including," and "having" are intended to be inclusive and mean that there may be additional elements other than the listed elements. Additionally, it should be understood that references to "one embodiment" or "an embodiment" of the present disclosure are not intended to be interpreted as excluding the existence of additional embodiments that also incorporate the recited features.

Some electronic displays may include a liquid crystal display (LCD) panel that uses the light-modulating properties of liquid crystals combined with polarizers and/or color filters to cause light passing through the panel to appear as different colors and hues. The light may be provided by a backlight made up of, for example one or more light-emitting diodes (LEDs). In some cases, the backlight may include rows and columns of light source elements (e.g., LEDs), referred to as a two-dimensional (2D) backlight.

At times, in operation, brightness or luminance of an LED of the backlight may be increased or decreased sharply (e.g., based on image content or a change in brightness setting). However, this sharp change in brightness, over time, may result in a change of operation of the LED, which may cause noticeable artifacts in the display. To prevent or smooth out this change in brightness, the brightness of the LED may be "sloped" or a gradually ramped between a current brightness value and a target brightness value. That is, the current brightness value and the target brightness value of the LED may be received, and a sloped or intermediate brightness may be interpolated based on the current brightness value and the target brightness value. In some cases, the sloped brightness may also be determined based on a temperature at the LED for greater accuracy. In this manner, sharp changes in brightness of the LED may be avoided or reduced, thus preventing or lessening noticeable artifacts in a display.

Additionally, the backlight may consume a variable amount of power depending on image content to be displayed on different parts of a display. If excessive power is consumed by the backlight, a voltage drop may occur that causes display circuitry to behave undesirably. To limit or reduce power consumed by the backlight, power consumption for a current row of LEDs to emit a target brightness may be estimated, and power consumption (e.g., present power consumption) of the other rows of LEDs of the backlight may be stored or combined in a final or total power consumption calculation. If the sum of these power consumptions is greater than a threshold power consumption, then the power supplied to all of the LEDs may be scaled down as to not exceed the threshold power consumption. In this manner, power delivery may be properly maintained, and a likelihood of voltage drop may be reduced or avoided.

Moreover, the LEDs may operate when supplied with a current and a voltage. In particular, the current for an LED may be supplied based on a desired brightness for the LED, which may be dependent on image content. Supplying at least a threshold voltage to the LED, which may vary based on the supplied current, may cause the LED to be operable (e.g., emit light). One way to ensure that all LEDs of the backlight are operable is to supply a relatively high voltage to all LEDs to ensure that the supplied voltage is greater than the variable threshold voltage level. However, supplying these higher voltages may inefficiently consume excess power. Instead, a reduced or minimum voltage to supply to an LED based on a current to supply to the LED may be determined to cause the LED to operate. The current may cause the LED to emit a desired brightness based on, for example, image content and/or a display brightness setting. The current and reduced voltage may then be supplied to the LED to operate the LED and cause the LED to emit the desired brightness. The reduced voltage may be less than the relatively high voltage that is uniformly supplied to all the LEDs of the backlight to ensure that the LEDs are all operable. In this manner, power may be conserved when operating the backlight.

Furthermore, the backlight may be updated based on changes in image content. For example, a zero-dimensional (0D) backlight, which may emit a substantially uniform amount of light for an entire image frame, may be updated once per new frame of image content. Thus, a 0D backlight may operate asynchronously to the LCD panel that it illuminates. A 2D backlight, however, may update while some pixel rows of the LCD panel are being written or are settling, which could produce image artifacts such as flickering or shimmering. To prevent the 2D backlight from updating while some pixel rows of the LCD panel are being written or are settling, updates to the backlight may be staggered in a synchronous manner with respect updating pixel values of the LCD panel. In particular, an interrupt may be sent from a controller of the LCD panel to the backlight to block updates to one or more LED rows of the backlight (e.g., corresponding to displaying a new image frame) while image content of the new image frame is written to pixels of the LCD panel. Once the image content has been written to the pixels, and the pixels have settled, then the interrupt may be canceled. The backlight may then be updated. In this manner, the backlight may be prevented from changing while image content is written to the LCD panel, reducing image artifacts on the display.

Also, a 0D backlight may age in a predictable way based on its operation over time, since it uses a single light source. The more the backlight is operated, as well as the higher the temperature of operation, the more the backlight may age. For a 2D backlight that is made up of multiple light sources (e.g., LEDs), aging may vary over time based on the content that the backlight illuminates, the different temperatures each LED is exposed to (e.g., as produced by neighboring components that may be different for each LED), and so on. As such, a "burn-in" effect may arise due to uneven aging of a 2D backlight, resulting in poorer display quality. To compensate for aging of and temperature at an LED, periodic compensation factors that compensate for aging and temperature of the LED may be determined over time. These compensation factors may be combined to determine a compensation factor, and current may be supplied to the LED based on the compensation factor. In this manner, display abnormalities, such as "burn-in" effects, may be avoided or reduced, resulting in better display quality.

Electronic devices that implement these disclosed techniques are described in herein. Moreover, it should be understood that any or all of the disclosed techniques may be combined together. That is, the electronic devices may include displays having LCD panels that operate in conjunction with 2D LED backlights that "slope" or gradually ramp a change in brightness of an LED, limit power to the backlight based on a target brightness of a current row of LEDs and power consumption of the other rows of LEDs, determine a reduced voltage to supply to an LED to cause the LED to operate based on a current to supply to the LED, send an interrupt to the backlight to block updates to the backlight while image content is written to pixels of the LCD panel, and/or compensate for aging of and temperature at an LED.

Turning first to FIG. 1, an electronic device 10 according to an embodiment of the present disclosure may include, among other things, one or more of processor(s) 12 (e.g., a processor core complex), memory 13, nonvolatile storage 14, a display 15, input structures 22, an input/output (I/O) interface 24, a network interface 26, a transceiver 28, and a power source 30. The various functional blocks shown in FIG. 1 may include hardware elements (including circuitry), software elements (including computer code stored on a computer-readable medium) or a combination of both hardware and software elements. Furthermore, a combination of elements may be included in tangible, non-transitory, and machine-readable medium that include machine-readable instructions. The instructions may be executed by the processor core complex 12 and may cause the processor core complex 12 to perform operations as described herein. It should be noted that FIG. 1 is merely one example of a particular embodiment and is intended to illustrate the types of elements that may be present in the electronic device 10.

Figure 3:
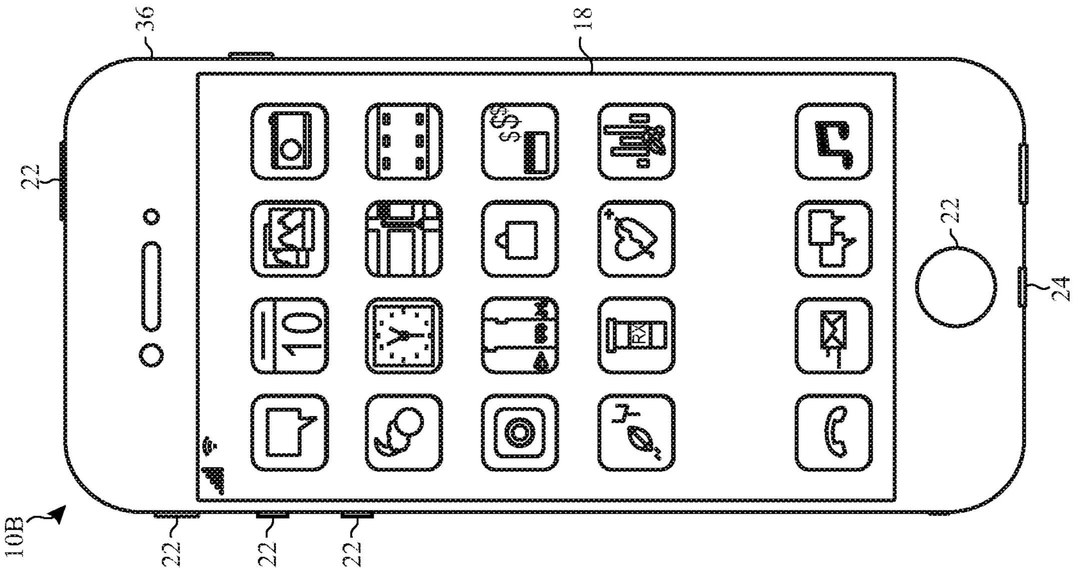
FIG. 3 is a front view of a handheld device representing a second embodiment of the electronic device of FIG. 1.
Figure 2:
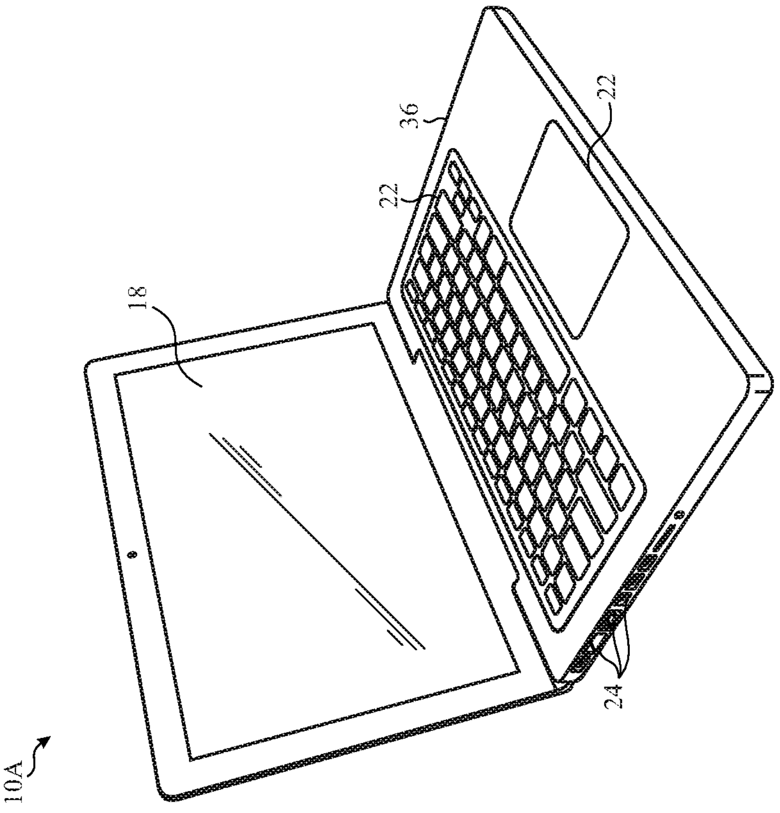
FIG. 2 is a perspective view of a notebook computer representing a first embodiment of the electronic device of FIG. 1.
Figure 5:
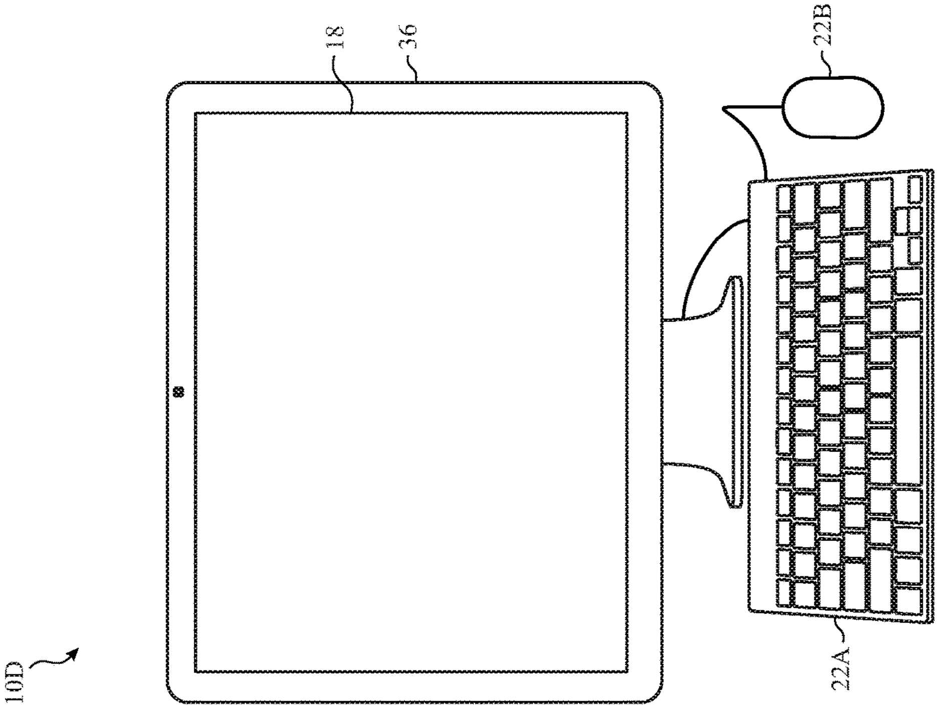
FIG. 5 is a front view of a desktop computer representing a fourth embodiment of the electronic device of FIG. 1.
Figure 4:
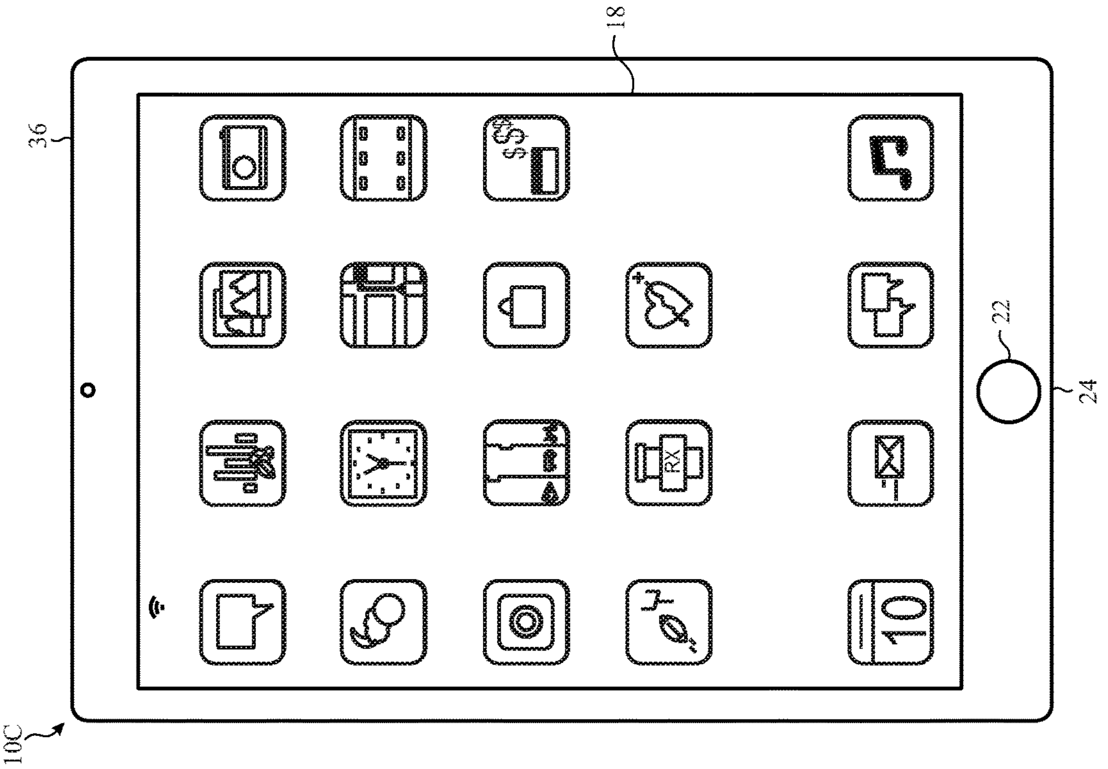
FIG. 4 is a front view of another handheld device representing a third embodiment of the electronic device of FIG. 1.
Figure 6:
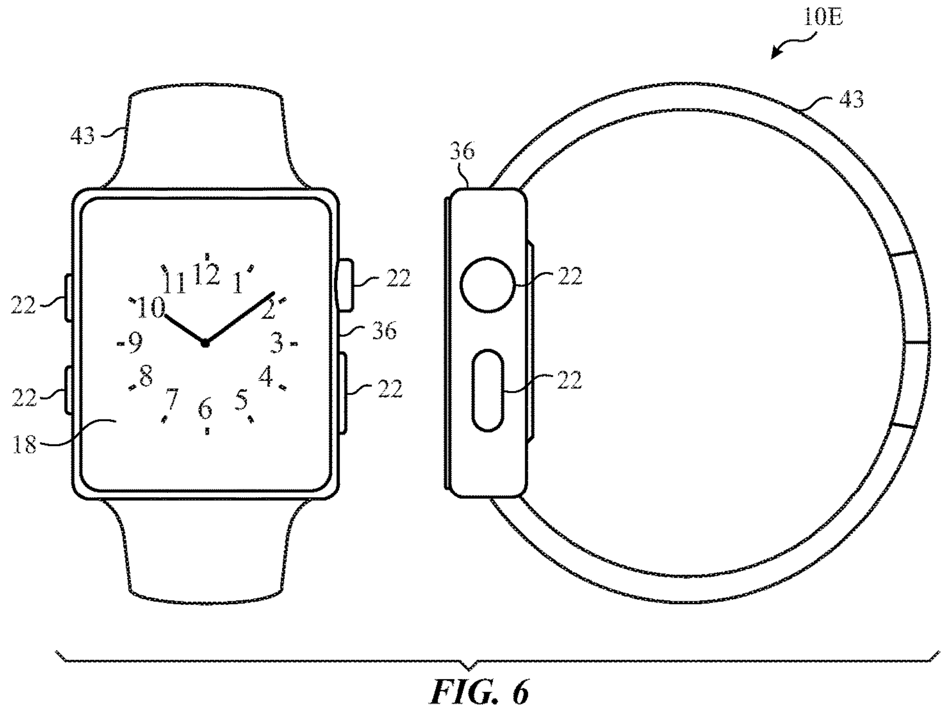
FIG. 6 is a front view and side view of a wearable electronic device representing a fifth embodiment of the electronic device of FIG. 1.

By way of example, the electronic device 10 may represent a block diagram of the notebook computer depicted in FIG. 2, the handheld device depicted in FIG. 3, the handheld device depicted in FIG. 4, the desktop computer depicted in FIG. 5, the wearable electronic device depicted in FIG. 6, or similar devices. It should be noted that the processor core complex 12 and other related items in FIG. 1 may be generally referred to herein as "data processing circuitry." Such data processing circuitry may be embodied wholly or in part as software, firmware, hardware, or any combination thereof. Furthermore, the data processing circuitry may be a single contained processing module or may be incorporated wholly or partially within any of the other elements within the electronic device 10.

In the electronic device 10 of FIG. 1, the processor core complex 12 may operably couple with the memory 13 and the nonvolatile storage 14 to perform various algorithms. Such programs or instructions executed by the processor core complex 12 may be stored in any suitable article of manufacture that includes one or more tangible, computer-readable media at least collectively storing the instructions or processes, such as the memory 13 and the nonvolatile storage 14. The memory 13 and the nonvolatile storage 14 may include any suitable articles of manufacture for storing data and executable instructions, such as random-access memory, read-only memory, rewritable flash memory, hard drives, and optical discs. Also, programs (e.g., an operating system) encoded on such a computer program product may also include instructions executable by the processor core complex 12 to enable the electronic device 10 to provide various functionalities.

In certain embodiments, the display 15 may be a liquid crystal display (LCD), which may facilitate users to view images generated on the electronic device 10. In particular, the display 15 may include a display panel 16 (e.g., an LCD panel), which may include liquid crystals combined with polarizers and/or color filters to cause light passing through the panel 16 to appear as different colors and hues. In some embodiments, the display 15 may include a touch screen, which may facilitate user interaction with a user interface of the electronic device 10. Furthermore, it should be appreciated that, in some embodiments, the display 15 may include one or more organic light-emitting diode (OLED) displays, or some combination of LCD panels and OLED panels. As illustrated, the light passing through the panel 16 may be provided by a backlight 17 made up of, for example one or more light-emitting diodes (LEDs) 18. In some cases, the backlight 17 may include rows and columns of light source elements (e.g., LEDs 18), referred to as a two-dimensional (2D) backlight.

The display 15 may include a display control system 19 or display pipe that operates the display 15. Although the display control system 19 is illustrated as part of the display 15, the display control system 19 may additionally or alternatively be part of the processor 12 (e.g., the processor core complex). For example, the display control system 19 may include pixel-processing logic, control logic, one or more microcontrollers, one or more processors (e.g., 12), one or more memory devices (e.g., 13), timing generation logic, compression logic, and so on. Similarly, the backlight 17 may include a backlight controller 20 (e.g., having one or more processors (e.g., 12) and/or one or more memory devices (e.g., 13)) that operates the backlight 17. The display control system 19 may include a backlight control system 21 that sends instructions to the backlight controller 20, such as to ensure synchronization between updates of pixel data and the LED array 18 of the backlight 17. In some embodiments, the backlight control system 21 may include one or more processors (e.g., 12) and/or one or more memory devices (e.g., 13).

The processors 12 (e.g., as part of or in the form of a controller) may operate circuitry to input or output data generated by the electronic device 10. For example, the processors 12 may control and/or operate the memory 13, the nonvolatile storage 14, display 15, input structures 22, an input/output (I/O interface) 24, a network interface 26, a transceiver 28, a power source 30, or the like to perform operations of the electronic device 10 and/or to facilitate control of the operations of the electronic device 10. In particular, the processors 12 may generate control signals for operating the transceiver 28 to transmit data on one or more communication networks.

The input structures 22 of the electronic device 10 may enable a user to interact with the electronic device 10 (e.g., pressing a button to increase or decrease a volume level). The I/O interface 24 may enable the electronic device 10 to interface with various other electronic devices, as may the network interface 26. The network interface 26 may include, for example, one or more interfaces for a personal area network (PAN), such as a BLUETOOTH® network, for a local area network (LAN) or wireless local area network (WLAN), such as an 802.11x WI-FI® network, and/or for a wide area network (WAN), such as a $3^{rd}$ generation (3G) cellular network, $4^{th}$ generation (4G) cellular network, LTE cellular network, long term evolution license assisted access (LTE-LAA) cellular network, $5^{th}$ generation (5G) cellular network, or New Radio (NR) cellular network. The network interface 26 may also include one or more interfaces for, for example, broadband fixed wireless access networks (e.g., WIMAX®), mobile broadband Wireless networks (mobile WIMAX®), asynchronous digital subscriber lines (e.g., ADSL, VDSL), digital video broadcasting-terrestrial (DVB-T®) network and its extension DVB Handheld (DVB-H®) network, ultra-wideband (UWB) network, alternating current (AC) power lines, and so forth.

In certain embodiments, the electronic device 10 may take the form of a computer, a portable electronic device, a wearable electronic device, or other type of electronic device. Such computers may be generally portable (such as laptop, notebook, and tablet computers) and/or those that are generally used in one place (such as desktop computers, workstations and/or servers). In certain embodiments, the electronic device 10 in the form of a computer may be a model of a MACBOOK®, MACBOOK® PRO, MACBOOK AIR®, IMAC®, MAC® mini, or MAC PRO® available from Apple Inc. of Cupertino, California. By way of example, the electronic device 10, taking the form of a notebook computer 10A, is illustrated in FIG. 2 in accordance with one embodiment of the present disclosure. The notebook computer 10A may include a housing or the enclosure 36, the display 15, the input structures 22, and ports associated with the I/O interface 24. In one embodiment, the input structures 22 (such as a keyboard and/or touchpad) may enable interaction with the notebook computer 10A, such as starting, controlling, or operating a graphical user interface (GUI) and/or applications running on the notebook computer 10A. For example, a keyboard and/or touchpad may facilitate user interaction with a user interface, GUI, and/or application interface displayed on display 15.

FIG. 3 depicts a front view of a handheld device 10B, which represents one embodiment of the electronic device 10. The handheld device 10B may represent, for example, a portable phone, a media player, a personal data organizer, a handheld game platform, or any combination of such devices. By way of example, the handheld device 10B may be a model of an IPOD® or IPHONE® available from Apple Inc. of Cupertino, California. The handheld device 10B may include the enclosure 36 to protect interior elements from physical damage and to shield them from electromagnetic interference. The enclosure 36 may surround the display 15. The I/O interface 24 may open through the enclosure 36 and may include, for example, an I/O port for a hard wired connection for charging and/or content manipulation using a connector and protocol, such as the Lightning connector provided by Apple Inc. of Cupertino, California, a universal serial bus (USB), or other similar connector and protocol.

The input structures 22, in combination with the display 15, may enable user control of the handheld device 10B. For example, the input structures 22 may activate or deactivate the handheld device 10B, navigate a user interface to a home screen, present a user-editable application screen, and/or activate a voice-recognition feature of the handheld device 10B. Other of the input structures 22 may provide volume control, or may toggle between vibrate and ring modes. The input structures 22 may also include a microphone to obtain a user's voice for various voice-related features, and a speaker to enable audio playback. The input structures 22 may also include a headphone input to enable input from external speakers and/or headphones.

FIG. 4 depicts a front view of another handheld device 10C, which represents another embodiment of the electronic device 10. The handheld device 10C may represent, for example, a tablet computer, or one of various portable computing devices. By way of example, the handheld device 10C may be a tablet-sized embodiment of the electronic device 10, which may be, for example, a model of an IPAD® available from Apple Inc. of Cupertino, California.

Turning to FIG. 5, a computer 10D may represent another embodiment of the electronic device 10 of FIG. 1. The computer 10D may be any computer, such as a desktop computer, a server, or a notebook computer, and/or may be a standalone media player or video gaming machine. By way of example, the computer 10D may be an IMAC®, a MACBOOK®, or other similar device by Apple Inc. of Cupertino, California. It should be noted that the computer 10D may also represent a personal computer (PC) by another manufacturer. The enclosure 36 may protect and enclose internal elements of the computer 10D, such as the display 15. In certain embodiments, a user of the computer 10D may interact with the computer 10D using various peripheral input devices, such as keyboard 22A or mouse 22B (e.g., input structures 22), which may operatively couple to the computer 10D.

Similarly, FIG. 6 depicts a wearable electronic device 10E representing another embodiment of the electronic device 10 of FIG. 1. By way of example, the wearable electronic device 10E, which may include a wristband 43, may be an APPLE WATCH® by Apple Inc. of Cupertino, California. However, in other embodiments, the wearable electronic device 10E may include any wearable electronic device such as, a wearable exercise monitoring device (e.g., pedometer, accelerometer, heart rate monitor), or other device by another manufacturer. The display 15 of the wearable electronic device 10E may include a touch screen version of the display 15 (e.g., LCD, OLED display, active-matrix organic light emitting diode (AMOLED) display, and so forth), as well as the input structures 22, which may facilitate user interaction with a user interface of the wearable electronic device 10E. In certain embodiments, as previously noted above, each embodiment (e.g., notebook computer 10A, handheld device 10B, handheld device 10C, computer 10D, and wearable electronic device 10E) of the electronic device 10 may include the transceiver 28.

Figure 7:
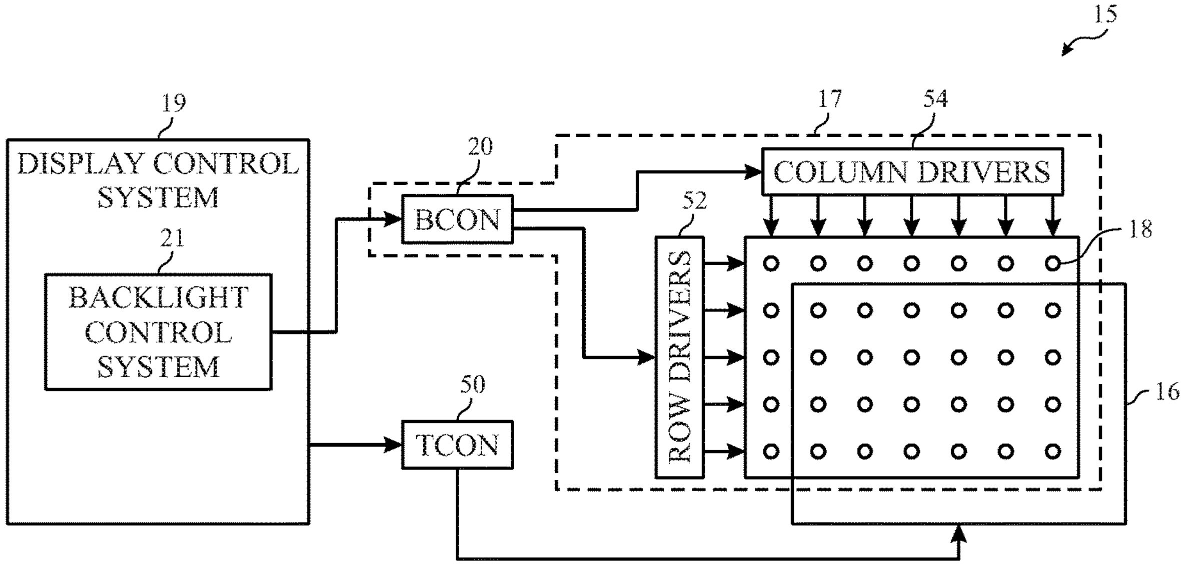
FIG. 7 is a schematic diagram of certain components of a display of the electronic device of FIG. 1, according to embodiments of the present disclosure.

Keeping the foregoing in mind, FIG. 7 is a schematic diagram of certain components of the display 15 of the electronic device 10 of FIG. 1, according to embodiments of the present disclosure. As illustrated, the display 15 includes the display control system 19 that is communicatively coupled to a timing controller 50, which is in turn communicatively coupled to the LCD panel 16. The display control system 19 may send image data to the timing controller 50, which converts the image data to a format suitable for input to source drivers of the panel 16 and/or generates control signals for gate and source drivers of the panel 16.

The display control system 19 includes the backlight control system 21, which is communicatively coupled to the backlight controller 20 that controls brightness of each LED 18 of the backlight 17 via row drivers 52 and column drivers 54. In particular, the backlight control system 21 may instruct the backlight controller 20 to set each LED 18 to a certain brightness based on image content to be displayed via pixels of the panel 16 (e.g., that correspond to respective LEDs 18) and/or a brightness setting of the display 15 (e.g., as set by a user).

Figure 8:
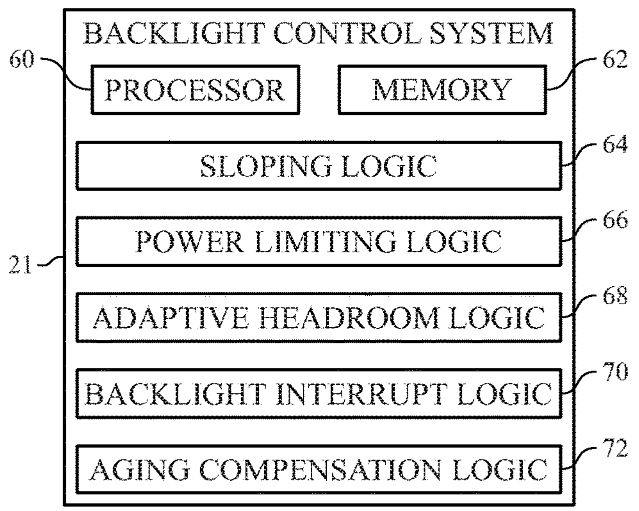
FIG. 8 is a block diagram of a backlight control system of the electronic device of FIG. 1, according to embodiments of the present disclosure.

FIG. 8 is a block diagram of the backlight control system 21 of the electronic device 10 of FIG. 1, according to embodiments of the present disclosure. As illustrated, the backlight control system 21 may include one or more processors 60, such as the one or more processors 12 described with respect to the electronic device 10. Similarly, the backlight control system 21 may include one or more memory devices 62, such as the one or more memory devices 13 described with respect to the electronic device 10.

The backlight control system 21 may also include sloping logic 64 that causes changes in brightness of an LED 18 to be "sloped" or a gradually ramped. In particular, the sloping logic 64 may receive a current brightness value and a target brightness value of the LED 18, and interpolate a sloped or intermediate brightness between the current brightness value and the target brightness value. In some cases, the sloping logic 64 may determine the sloped brightness based on the temperature at the LED 18, temperature of the corresponding LCD pixels of the panel 16 that are in front of that LED 18, or both. In this manner, the sloping logic 64 may avoid or reduce sharp changes in brightness of the LED 18, thus preventing or lessening noticeable artifacts in the display 15. The term "logic" may refer to hardware (e.g., circuitry, including the processor 60), software (e.g., code or machine-executable instructions, stored in the memory 62), firmware (e.g., software permanently programmed into read-only memory, including the memory 62) or any combination thereof.

The backlight control system 21 may additionally include power limiting logic 66 that limits or reduces power consumed by the backlight 17. In particular, the power limiting logic 66 may estimate power consumption for any combination of rows of LEDs 18, from a current row of LEDs 18 being driven at a specific time to a sum of power consumption of all LED rows of the backlight 17. For example, the power limiting logic 66 may estimate a power consumption for a current row of LEDs 18 to emit a target brightness (e.g., based on image content and/or a display brightness setting), and store power consumption (e.g., present power consumption) of the other rows of LEDs 18 of the backlight 17. If the power limiting logic 66 determines that the sum of these power consumptions is greater than a threshold power consumption, then the power limiting logic 66 may scale down the power supplied to all of the LEDs as to not exceed the threshold power consumption. In this manner, the power limiting logic 66 may properly maintain power delivery and reduce or avoid a likelihood of a voltage drop.

The backlight control system 21 may further include adaptive headroom logic 68 that determines a reduced or minimum voltage to supply to an LED 18 based on a current to supply to the LED 18 to cause the LED 18 to operate. The current may cause the LED 18 to emit a desired brightness based on, for example, image content and/or a display brightness setting. The current and reduced voltage may then be supplied to the LED 18 to operate the LED 18 and cause the LED 18 to emit the desired brightness. The reduced voltage may be less than a relatively high voltage that could be uniformly supplied to all the LEDs 18 of the backlight 17 to ensure that the LEDs 18 are all operable. In this manner, the adaptive headroom logic 68 may conserve power when operating the backlight 17.

The backlight control system 21 may also include backlight interrupt logic 70 that staggers updates to the backlight 17 in a synchronous manner with respect updating pixel values of the LCD panel 16. In particular, the backlight control system 21 may send an interrupt to the backlight 17 to block updates to the one or more LED rows of the backlight 17 (e.g., corresponding to displaying a new image frame) while image content of the new image frame is written to pixels of the display panel 16. Once the image content has been written to the pixels, and the pixels have settled, then the backlight interrupt logic 70 may cancel the interrupt. The backlight 17 may then be updated. In this manner, the backlight interrupt logic 70 may prevent the backlight 17 from changing while image content is written to the display panel 16, thus reducing image artifacts on the display 15.

The backlight control system 21 may additionally include aging compensation logic 72 that compensates for aging of and temperature at an LED 18. In particular, the aging compensation logic 72 may determine periodic compensation factors over time that compensate for aging and temperature of the LED 18. The aging compensation logic 72 may combine these compensation factors to determine a single compensation factor, and current may be supplied to the LED 18 based on the compensation factor. In this manner, the aging compensation logic 72 may avoid or reduce display abnormalities, such as "burn-in" effects, resulting in better display quality.

It should be understood that any or all of the disclosed logics and/or methods may be combined together. That is, the backlight control system 21 of the electronic device 10 may include any combination of the sloping logic 64, the power limiting logic 66, the adaptive headroom logic 68, the backlight interrupt logic 70, and the aging compensation logic 72.

Figure 9:
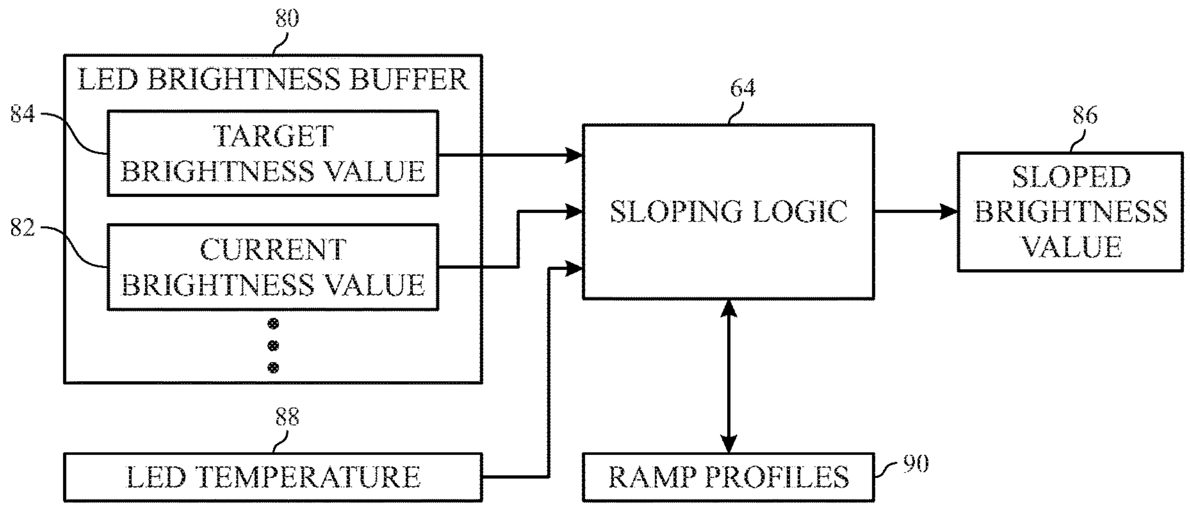
FIG. 9 is a block diagram of sloping logic of the backlight control system of FIG. 8 in operation, according to embodiments of the present disclosure.

FIG. 9 is a block diagram of the sloping logic 64 of the backlight control system 21 of FIG. 8 in operation, according to embodiments of the present disclosure. The sloping logic 64 causes changes in brightness of an LED 18 to be "sloped" or gradually ramped to avoid or reduce sharp changes in brightness of the LED 18. The backlight control system 21 may include an LED brightness buffer 80 that stores brightness values (e.g., in nits) for the LEDs 18 of the backlight 17. The LED brightness buffer 80 may be stored in the memory device 62, for example. In some embodiments, the brightness values for the LEDs 18 may be estimated based on, for example, current supplied to the LEDs 18 and/or previous calibration of the LEDs 18 (e.g., as measured, tested, and/or calibrated during manufacturing). The LED brightness buffer 80 may store current brightness values 82 for the LEDs 18, as well as previous brightness values (e.g., the last three brightness values) for the LEDs 18. In some cases, a brightness value may be determined for each LED 18, while, in other cases, a brightness value may be determined for each zone or "frame" of the array or grid of LEDs 18 of the backlight 17. The LED brightness buffer 80 may store target or desired brightness values 84 for the LEDs 18, which may be based on image content to be displayed by the display 15 (e.g., brighter content or portions of content may have higher brightness values for corresponding LEDs 18, dimmer content or portions of content may have lower brightness values for corresponding LEDs 18).

The sloping logic 64 may interpolate a sloped or intermediate brightness 86 for an LED 18 between the current brightness value 82 and the target brightness value 84. The interpolation may be non-linear to allow any type of transition curve from the current brightness value 82 and the target brightness value 84. In some embodiments, a predetermined transition curve may be stored in the memory device 62. The sloped brightness 86 may be chosen as data point on the curve based on a relative time with respect to an LCD pixel update time or an update index that is configured by firmware. The update index may be based on current or brightness provided as an update to the LED 18, and facilitate selecting an interpolation weight between the current brightness value 82 and the target brightness value 84 based on the curve.

In some cases, the sloping logic 64 may determine the sloped brightness value 86 based on a temperature 88 at the LED 18 for greater accuracy. That is, because temperature 88 at the LED 18 and/or temperature of the corresponding LCD pixels of the panel 16 that are in front of that LED 18 may affect operation of the LED 18 (e.g., change brightness of the LED 18), the sloped brightness 86 may be generated or adjusted based on temperature. In particular, the curve used to select the sloped brightness 86 may include a temperature axis. In some embodiments, the temperature 88 may be measured using a temperature sensor at the LED 18. In additional or alternative embodiments, the temperature 88 may be calculated using a temperature grid or table based on, for example, current at the LED 18.

In some embodiments, the sloping logic 64 may determine an interpolated brightness between the current brightness value 82 and the target brightness value 84 based on the temperature curve, and then combine the interpolated brightness, the current brightness value 82, and the target brightness value 84 to generate the sloped brightness value 86. The sloping logic 64 may apply weights to each of the interpolated brightness, the current brightness value 82, and the target brightness value 84 to generate the sloped brightness 86. For example, the backlight control system 21 may include ramp profiles 90 that include different weights for the interpolated brightness, the current brightness value 82, and the target brightness value 84 that vary with temperature, duration (e.g., of activating the LED 18), and/or configuration. That is, the weights may change depending on the temperature at the LED 18, to compensate for the temperature 88. The weights may be determined based on a calibration process (e.g., performed during manufacturing) to accurately compensate for the temperature 88 at the LED 18. The weights may additionally or alternatively be dependent on an actual frame time in the case that the LCD refresh rate is variable.

Accordingly, the sloping logic 64 may determine a corresponding ramp profile 90 based on the temperature 88 at the LED 18, and apply the weights of the ramp profile 90 to the interpolated brightness, the current brightness value 82, and the target brightness value 84 to determine a sloped brightness value 86. The backlight control system 21 may then cause the LED 18 to activate at the sloped brightness value 86. In a next iteration, the backlight control system 21 may store the sloped brightness value 86 as the next current brightness value 82 in the LED brightness buffer 80. In this manner, the sloping logic 64 may avoid or reduce sharp changes in brightness of the LED 18, thus preventing or lessening noticeable artifacts in the display 15. In some embodiments, the sloping logic 64 may generate sloped brightness values 86 at an update rate that is greater than or equal to the update or frame rate of the LCD panel 16.

Figure 10:
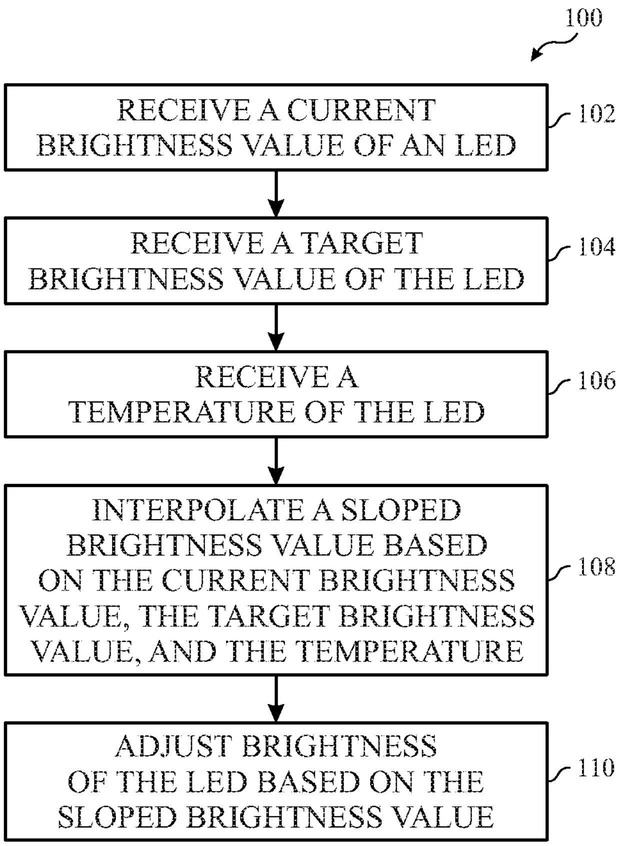
FIG. 10 is a flowchart of a method for sloping or gradually ramping changes in brightness of a light-emitting diode (LED) of the display of the electronic device of FIG. 1, according to embodiments of the present disclosure.

With the foregoing in mind, FIG. 10 is a flowchart of a method 100 for sloping or gradually ramping changes in brightness of an LED 18, according to embodiments of the present disclosure. It is noted that, although depicted in a particular order, the blocks of the method 100 may be performed in any suitable order, and at least some blocks may be skipped altogether. As described herein, the method 100 is described as performed by the sloping logic 64 and the backlight control system 21, however, it should be understood that any suitable processing and/or control circuitry may perform some or all of the operations of the method 100, such as the processor 60 and/or the processor core complex 12, based on executing instructions stored in a memory device, such as the memory device 62 and/or the memory device 13.

At block 102, the sloping logic 64 receives a current brightness value 82 of the LED 18. In particular, the current brightness value 82 may be the brightness that the LED 18 is currently emitting. The current brightness value 82 may be measured (e.g., using a sensor coupled to the LED 18), estimated (e.g., based on a current supplied to the LED 18), and/or stored and received from the LED brightness buffer 80.

At block 104, the sloping logic 64 determines or receives a target brightness value 84 of the LED 18. In particular, the target brightness value 84 may be a desired brightness that the LED 18 is to emit. The target brightness value 84 may be based on image content to be backlit by the LED 18 and/or a brightness setting of the LED 18. The target brightness value 84 may be stored and received from the LED brightness buffer 80.

At block 106, the sloping logic 64 receives a temperature 88 of the LED 18. The temperature 88 may be provided by a temperature sensor coupled to the LED 18 and/or estimated based on a current supplied to the LED 18. At block 108, the sloping logic 64 interpolates a sloped brightness value 86 based on the current brightness value 82, the target brightness value 84, and the temperature 88 of the LED 18. The sloping logic 64 may also or alternatively interpolate the sloped brightness value 86 based on current LCD refresh rate and/or frame duration (e.g., a time the LCD frame is on the panel 16). In some embodiments, the sloping logic 64 may determine an interpolated brightness between the current brightness value 82 and the target brightness value 84 based on a predetermined temperature curve, and then combine the interpolated brightness, the current brightness value 82, and the target brightness value 84 to generate the sloped brightness value 86. The sloping logic 64 may apply weights to each of the interpolated brightness, the current brightness value 82, and the target brightness value 84 to generate the sloped brightness 86. In particular, the sloping logic 64 may determine a corresponding ramp profile 90 based on the temperature 88 at the LED 18, and apply weights of the ramp profile 90 to the interpolated brightness, the current brightness value 82, and the target brightness value 84 to determine the sloped brightness value 86.

At block 110, the backlight control system 21 may then cause the LED 18 to activate at the sloped brightness value 86. In a next iteration, the backlight control system 21 may store the sloped brightness value 86 as the next current brightness value 82 in the LED brightness buffer 80. In this manner, the method 100 may avoid or reduce sharp changes in brightness of the LED 18, thus preventing or lessening noticeable artifacts in the display 15.

Figure 11:
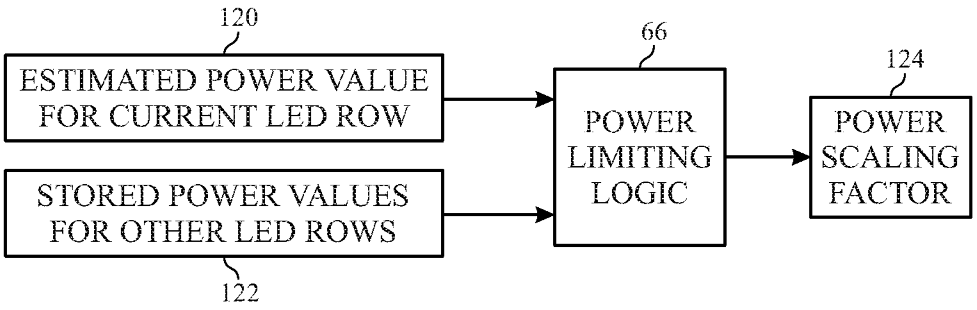
FIG. 11 is a block diagram of power limiting logic of the backlight control system of FIG. 8 in operation, according to embodiments of the present disclosure.

FIG. 11 is a block diagram of the power limiting logic 66 of the backlight control system 21 of FIG. 8 in operation, according to embodiments of the present disclosure. The power limiting logic 66 limits or reduces power consumed by the backlight 17. In particular, the power limiting logic 66 may estimate a power consumption 120 for a current row of LEDs 18 to emit a target brightness (e.g., based on image content and/or a display brightness setting). That is, the backlight control system 21 may receive or determine a target brightness for which the current row of LEDs 18 should emit based on image content that is to be displayed on the display 15 and/or a brightness setting of the display 15.

The backlight control system 21 may also store power consumption values 122 (e.g., present power consumption values) of the other rows of LEDs 18 of the backlight 17. That is, the current power consumed for each of the other rows of LEDs 18 used to display current image content may be determined or estimated and stored in memory (e.g., the memory 62). The power limiting logic 66 may sum these power consumptions together, and compare to a threshold power consumption. The threshold power consumption may be any suitable power limit for the backlight 17 to consume. If the sum of the power consumptions is greater than the threshold power consumption, then the power limiting logic 66 may scale down the power supplied to all of the LEDs 18 so that the power consumed by the LEDs 18 does not exceed the threshold power consumption. In some embodiments, the power limiting logic 66 may generate a power scaling factor 124 that, when applied by the backlight control system 21 to the power supplied to all of the LEDs 18, the power consumed by the LEDs 18 does not exceed the threshold power consumption. In additional or alternative embodiments, the power limiting logic 66 may decrease the power supplied to all LEDs 18 by the same amount so that the power consumed by the LEDs 18 does not exceed the threshold power consumption. In other examples, the power limiting logic 66 may reduce (e.g., scale down) current to a present row of the LEDs 18 but not to any other rows of LEDs 18. In this manner, the power limiting logic 66 may properly maintain power delivery and reduce or avoid a likelihood of a voltage drop.

Figure 12:
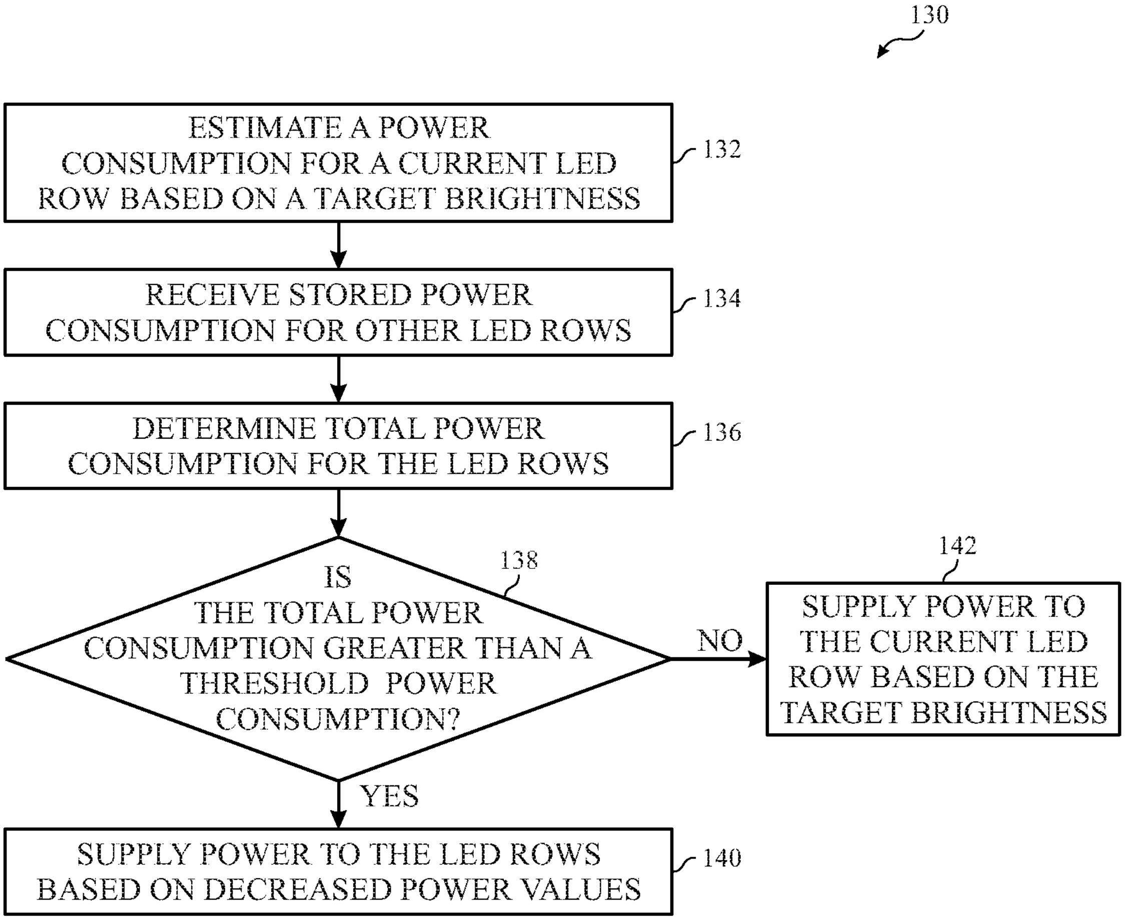
FIG. 12 is a flowchart of a method for limiting power consumed by a backlight of the display of the electronic device of FIG. 1, according to embodiments of the present disclosure.

With the foregoing in mind, FIG. 12 is a flowchart of a method 130 for limiting power consumed by the backlight 17, according to embodiments of the present disclosure. It is noted that, although depicted in a particular order, the blocks of the method 130 may be performed in any suitable order, and at least some blocks may be skipped altogether. As described herein, the method 130 is described as performed by the power limiting logic 66 and the backlight control system 21, however, it should be understood that any suitable processing and/or control circuitry may perform some or all of the operations of the method 130, such as the processor 60 and/or the processor core complex 12, based on executing instructions stored in a memory device, such as the memory device 62 and/or the memory device 13.

At block 132, the power limiting logic 66 estimates a power consumption 120 for a current LED row based on a target brightness. That is, the backlight control system 21 may receive or determine a target brightness for which the current row of LEDs 18 should emit based on image content that is to be displayed on the display 15 and/or a brightness setting of the display 15.

At block 134, the power limiting logic 66 receives stored power values 122 for other LED rows. The stored power consumption values 122 may include power that is currently being consumed for each of the other rows of LEDs 18 that is, for example, used to display current image content. The stored power consumption values 122 may be measured (e.g., using a sensor coupled to the rows of LEDs 18) or estimated (e.g., based on current supplied to the LEDs 18), and stored in memory (e.g., the memory 62).

At block 136, the power limiting logic 66 determines total power consumption for the LED rows. In particular, the power limiting logic 66 may sum the estimated power consumption 120 for the current LED row and the stored power consumptions 122 for the other LED rows. At block 138, the power limiting logic 66 determines whether the total power consumption is greater than a threshold power consumption. The threshold power consumption may be any suitable power limit for the backlight 17 to consume. If the sum of the power consumptions is greater than the threshold power consumption, then, at block 140, the power limiting logic 66 supplies power to the LED rows based on decreased power values. That is, the power limiting logic 66 and/or the backlight control system 21 may scale down the power supplied to all of the LEDs 18 so that the power consumed by the LEDs 18 does not exceed the threshold power consumption. In some embodiments, the power limiting logic 66 may generate a power scaling factor 124 that, when applied by the backlight control system 21 to the power supplied to all of the LEDs 18, the power consumed by the LEDs 18 does not exceed the threshold power consumption. In additional or alternative embodiments, the power limiting logic 66 may determine an amount of power by which to decrease the power supplied to all LEDs 18, and decrease the power supplied to all LEDs 18 by that same determined amount so that the power consumed by the LEDs 18 does not exceed the threshold power consumption. As such, the current LED row may emit a brightness that is less than the target brightness (since it is supplied less power than that corresponding to the estimated power consumption), and the other LED rows may consume less power than the stored power consumption values 122 (since they are supplied less power than that corresponding to the stored power consumption values 122).

If the sum of the power consumptions is not greater than the threshold power consumption, then, at block 142, the backlight control system 21 supplies the power to the current LED row based on the target brightness. As such, the current LED row may consume approximately the estimated power consumption 120, while the other LED rows may consume the stored power compensation values 122, as the sum of these power compensation values does not exceed the threshold power consumption. In this manner, the method 130 may properly maintain power delivery and reduce or avoid a likelihood of a voltage drop.

Figure 13:
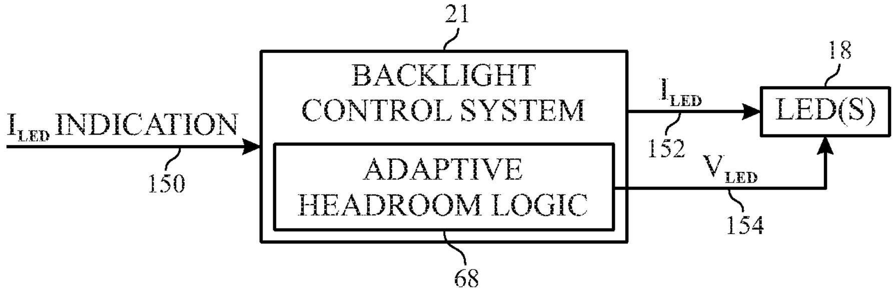
FIG. 13 is a block diagram of adaptive headroom logic of the backlight control system of FIG. 8 in operation, according to embodiments of the present disclosure.

FIG. 13 is a block diagram of the adaptive headroom logic 68 of the backlight control system 21 of FIG. 8 in operation, according to embodiments of the present disclosure. The adaptive headroom logic 68 determines a reduced or minimum voltage ("$V_{LED}$") to supply to an LED 18 based on a current ("$I_{LED}$") to supply to the LED 18 to cause the LED 18 to operate. In particular, the backlight control system 21 may receive an indication 150 of the current 152 to supply to the LED 18 and transmit the current 152 to the LED 18 to cause the LED 18 to emit a desired brightness based on, for example, image content and/or a display brightness setting.

To cause the LED 18 to be operable, a voltage may be supplied to the LED 18 that is greater than a threshold voltage. The threshold voltage may vary with the supplied current 152, such that the greater the supplied current 152, the greater the threshold voltage, and vice versa. As such, one way to ensure that all LEDs 18 of the backlight 17 are operable is to supply a relatively high voltage to all LEDs 18 (e.g., that is greater than the highest possible threshold voltage corresponding to the highest supplied current) to ensure that the supplied voltage for each LED 18 is greater than the variable threshold voltage level for that LED 18. However, supplying the relatively high voltage to all LEDs 18 may be inefficient, as it is rare that each LED 18 is being supplied the highest current to drive up the threshold voltage to its maximum value. Instead, the adaptive headroom logic 68 may dynamically determine a reduced voltage 154 (e.g., a minimum voltage) based on the current 152 to supply to the LED 18 to cause the LED 18 to become operable. Accordingly, each LED 18 may be supplied with a dynamically determined, different (e.g., non-uniform) voltage that enables conserving power when operating the backlight 17.

Figure 14:
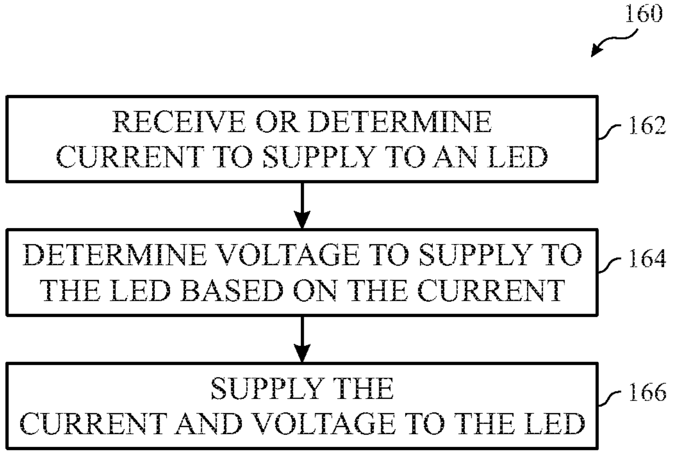
FIG. 14 is a flowchart of a method for determining a reduced voltage to supply to an LED based on current to supply to the LED to cause the LED to operate, according to embodiments of the present disclosure.

With the foregoing in mind, FIG. 14 is a flowchart of a method 160 for determining a reduced voltage to supply to an LED 18 based on the current 152 to supply to the LED 18 to cause the LED 18 to operate, according to embodiments of the present disclosure. It is noted that, although depicted in a particular order, the blocks of the method 160 may be performed in any suitable order, and at least some blocks may be skipped altogether. As described herein, the method 160 is described as performed by the adaptive headroom logic 68 and the backlight control system 21, however, it should be understood that any suitable processing and/or control circuitry may perform some or all of the operations of the method 160, such as the processor 60 and/or the processor core complex 12, based on executing instructions stored in a memory device, such as the memory device 62 and/or the memory device 13.

At block 162, the adaptive headroom logic 68 receives or determines the current 152 to supply to an LED 18. In particular, the backlight control system 21 may receive an indication 150 of the current 152 to supply to the LED 18 and transmit the current 152 to the LED 18 to cause the LED 18 to emit a desired brightness based on, for example, image content and/or a display brightness setting. The adaptive headroom logic 68 may receive or determine the current 152 based on the indication 150.

At block 164, the adaptive headroom logic 68 determines the reduced voltage 154 to supply to the LED 18 based on the current 152. That is, the adaptive headroom logic 68 may dynamically determine a reduced voltage 154 (e.g., a minimum voltage) based on the current 152 to supply to the LED 18 to cause the LED 18 to become operable. In some embodiments, the reduced voltage 154 may be calibrated, measured, or determined during manufacturing of the electronic device 10 (e.g., by determining the lowest voltage that operates the LED 18 with the supplied current 152). In additional or alternative embodiments, the reduced voltage 154 may be interpolated (e.g., based on calibrated data points or an interpolation curve generated using calibration data).

At block 166, the backlight control system 21 supplies the current 152 and the reduced voltage 154 to the LED 18. In this manner, the method 160 may conserve power when operating the backlight 17.

Figure 15:
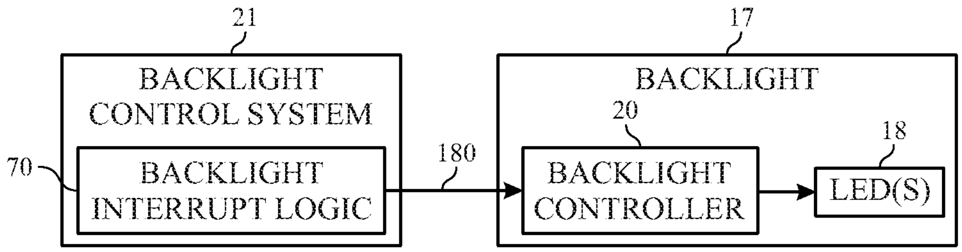
FIG. 15 is a block diagram of a backlight interrupt logic of the backlight control system of FIG. 8 in operation, according to embodiments of the present disclosure.

FIG. 15 is a block diagram of the backlight interrupt logic 70 of the backlight control system 21 of FIG. 8 in operation, according to embodiments of the present disclosure. The backlight interrupt logic 70 staggers updates to the backlight 17 in a synchronous manner with respect updating pixel values of the LCD panel 16 by sending an interrupt 180 to the backlight controller 20 of the backlight 17 to block updates to one or more LED rows of the backlight 17 (e.g., corresponding to displaying a new image frame) while image content of the new image frame is written to pixels of the display panel 16. Once the image content has been written to the pixels, and the pixels have settled, then the backlight interrupt logic 70 may cancel the interrupt 180. The backlight controller 20 may then resume updating the backlight 17. That is, the interrupt 180 may be applied to blocking updates to a portion of the backlight 17 (e.g., one or more LEDs 18) corresponding to image content being written to corresponding pixels (e.g., a pixel row, a zone of pixels) of the panel 16, instead of blocking updates to the entire backlight 17. In this manner, the backlight interrupt logic 70 may prevent the backlight 17 from changing while image content is written to the display panel 16, thus reducing image artifacts on the display 15.

Figure 16:
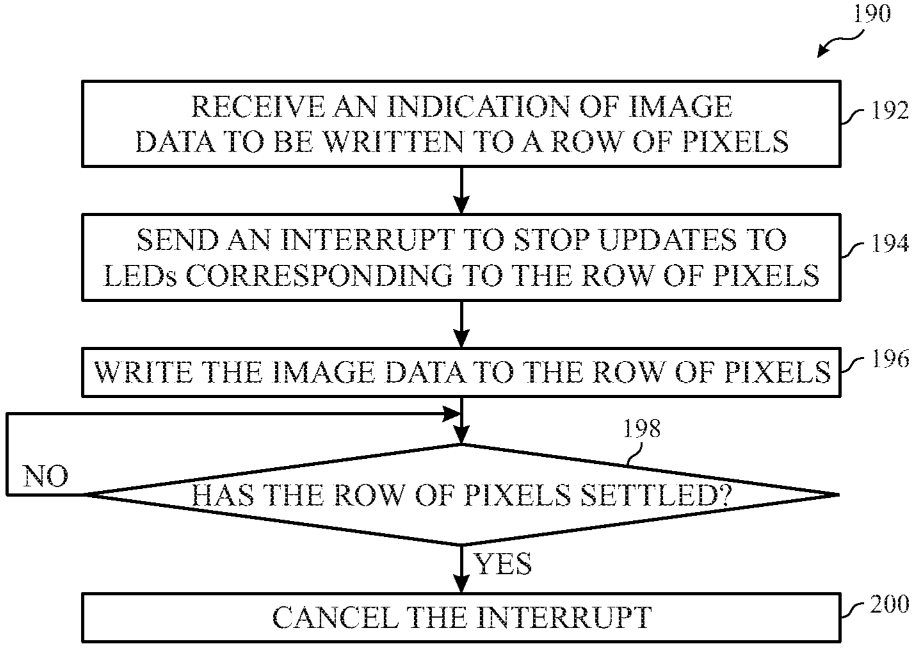
FIG. 16 is a flowchart of a method for staggering updates to the backlight, according to embodiments of the present disclosure.

With the foregoing in mind, FIG. 16 is a flowchart of a method 190 staggering updates to the backlight 17, according to embodiments of the present disclosure. It is noted that, although depicted in a particular order, the blocks of the method 190 may be performed in any suitable order, and at least some blocks may be skipped altogether. As described herein, the method 190 is described as performed by the backlight interrupt logic 70, however, it should be understood that any suitable processing and/or control circuitry may perform some or all of the operations of the method 190, such as the processor 60 and/or the processor core complex 12, based on executing instructions stored in a memory device, such as the memory device 62 and/or the memory device 13.

At block 192, the backlight interrupt logic 70 receives an indication that image data is to be written to a row of pixels of the panel 16. For example, the backlight control system 21 may receive the image data corresponding to a frame of image data to be displayed using the row of pixels, and send the indication of the image data to the backlight interrupt logic 70.

At block 194, the backlight interrupt logic 70 sends an interrupt 180 to stop updates to LEDs 18 corresponding to the row of pixels. In particular, the interrupt 180 may stop updates (e.g., new brightness control signals or instructions) for those LEDs 18 that provide backlighting for the LEDs 18. At block 196, the backlight interrupt logic 70 write the image data to the row of pixels. Because the brightnesses of the LEDs 18 are maintained, image artifacts resulting from updating the LEDs 18 while image data is written in the pixels may be reduced.

At block 198, the backlight interrupt logic 70 determine whether the row of pixels has settled. That is, while or soon after image data is written into a pixel, the voltage of a pixel may vary prior to settling. During this voltage variation, the image data displayed by the pixel may also vary. Eventually, the voltage of the pixel may settle to a relatively constant value (e.g., the voltage value remains the same or is within a threshold range of the voltage value for a threshold duration of time). The backlight interrupt logic 70 may determine that the row of pixels has settled based on receiving constant voltage values from the row of pixels via, for example, one or more voltage sensors coupled to the row of pixels.

If not, the backlight interrupt logic 70 determines that the row of pixels has not settled, then the block 198 may be repeated. Once the backlight interrupt logic 70 determines that the row of pixels has settled, then, at block 200, the backlight interrupt logic 70 cancels the interrupt 180. For example, the backlight interrupt logic 70 may send a cancellation signal to the backlight controller 20 to unblock updates to the LEDs 18 corresponding to the row of pixels. As such, the backlight controller 20 may resume updating the LEDs 18. In this manner, the method 190 may prevent the backlight 17 from changing while image content is written to the display panel 16, thus reducing image artifacts on the display 15. While the method 190 is described as applied to a row of pixels of the panel 16 and sending the interrupt to corresponding LEDs 18, it should be understood that the method 190 may be applied to any number or configuration of pixels, such as one pixel of the panel 16, a zone or array of pixels, or all pixels of the panel 16.

Figure 17:
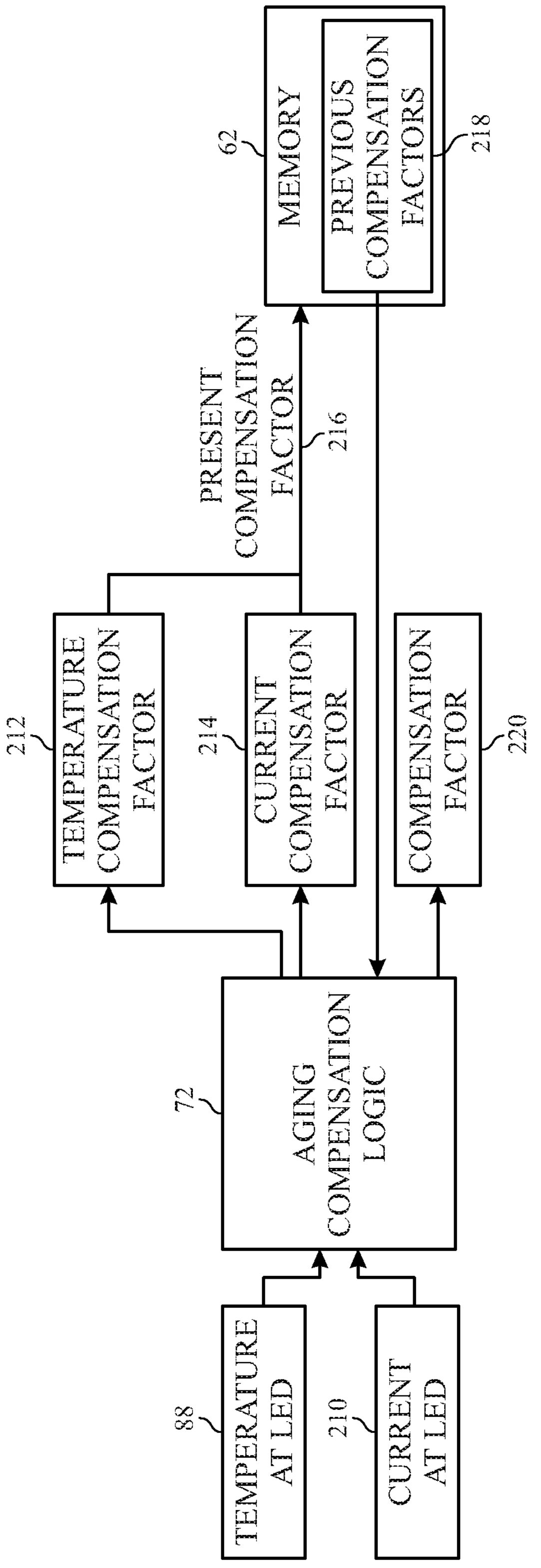
FIG. 17 is a block diagram of aging compensation logic of the backlight control system of FIG. 8 in operation, according to embodiments of the present disclosure.

FIG. 17 is a block diagram of the aging compensation logic 72 of the backlight control system 21 of FIG. 8 in operation, according to embodiments of the present disclosure. The aging compensation logic 72 compensates for aging of and temperature at an LED 18. In particular, the aging compensation logic 72 may determine or receive the temperature 88 at the LED 18 over time. In some embodiments, the temperature 88 may be measured using a temperature sensor at the LED 18 or estimated based on current at the LED 18. In additional or alternative embodiments, the temperature 88 may be calculated using a temperature grid or table.

Figure 18:
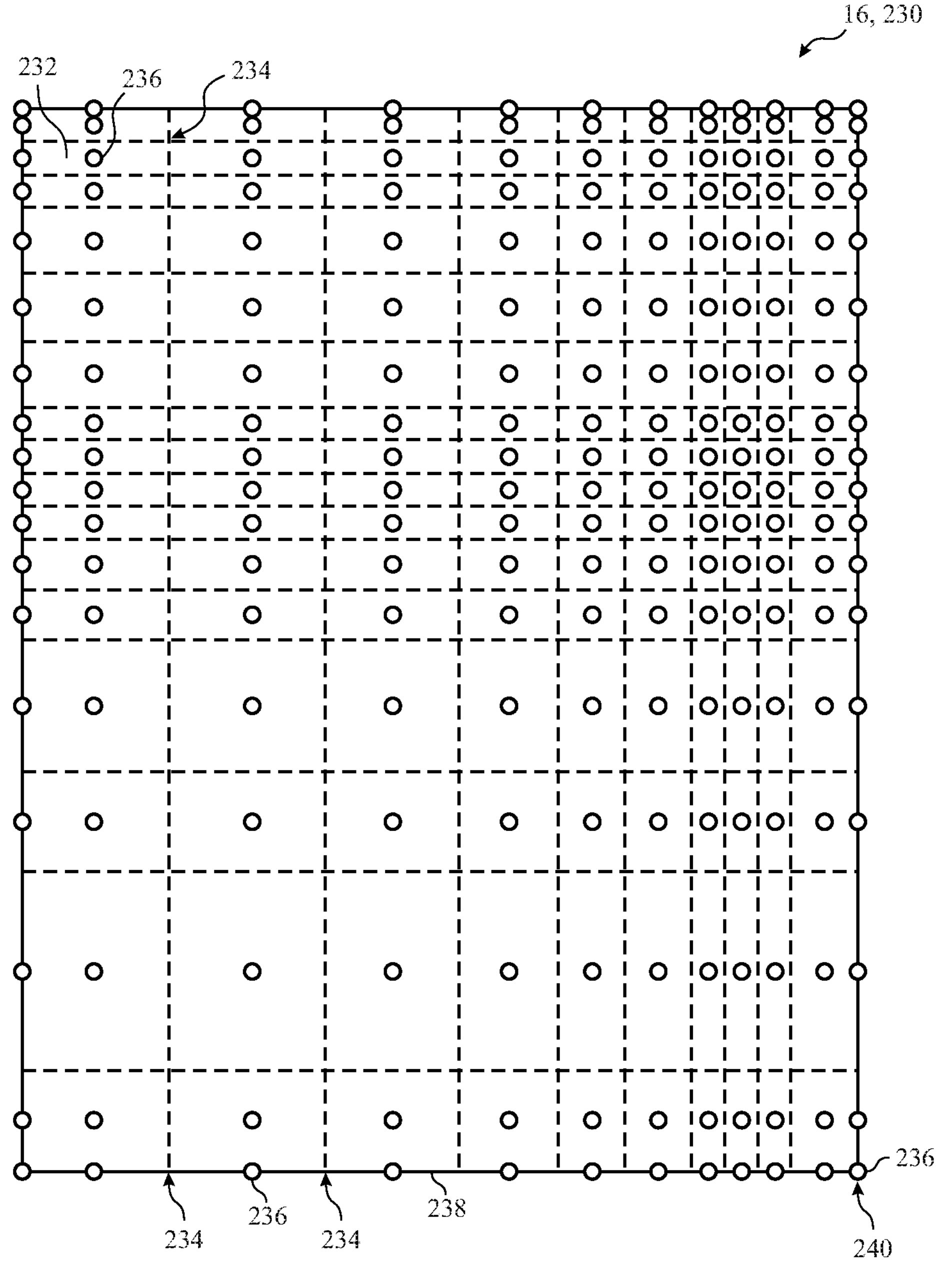
FIG. 18 is a schematic diagram of a temperature grid disposed over a panel of the display of the electronic device of FIG. 1, according to embodiments of the present disclosure.

As an illustrative example, FIG. 18 is a schematic diagram of a temperature grid 230 disposed over the panel 16, according to embodiments of the present disclosure. The grid 230 may split the panel 16 into multiple tiles 232. Each tile 232 may be defined by four grid points 234, and have a temperature point 236 disposed in the center of the tile 232. Temperature points 236 may also be disposed along the edges 238 of the display panel 16 between grid points 234, as well as at corners 240 of the panel 16. The temperature points 236 may be locations at which temperature is sensed (e.g., via a temperature sensor) or estimated (e.g., based on calibration performed during manufacturing of the electronic device 10 and/or nearby components at the corresponding tile 232). As illustrated, the temperature points 236 may be non-uniformly spaced across the panel 16 to enable finer resolution at various positions (e.g., that may be subject to more temperature fluctuation or variation due to nearby components or circuitry).

Figure 19:
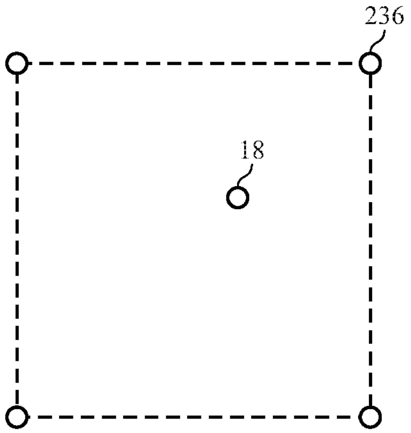
FIG. 19 is a schematic diagram of an LED of the display of the electronic device of FIG. 1 that is surrounded by temperature points, according to embodiments of the present disclosure.

Because an LED 18 may not be located at a temperature point 236, the aging compensation logic 72 may determine the temperature points 236 that surround the LED 18, and interpolate the temperature 88 at the LED 18 based on the surrounding temperature points 236. As an illustrative example, FIG. 19 is a schematic diagram of an LED 18 that is surrounded by temperature points 236, according to embodiments of the present disclosure. The temperature 88 of the LED 18 may be interpolated based on its distance from the temperature points 236. The aging compensation logic 72 may generate a temperature compensation factor 212 based on the temperature of the LED 18. In some embodiments, the temperature compensation factor 212 may be expressed as a calibrated parameter taken to the power of the quotient of the difference between a reference temperature and the temperature 88 of the LED 18 divided by a constant value. It should be understood that determining the temperature for the LED 18 in this manner may be applied to any of the other logics or methods described herein, including the sloping logic 64 and/or the method 100.

The aging compensation logic 72 may also determine or receive current 210 at the LED 18 over time. The current 210 may be measured using a current sensor at the LED 18 or estimated based on current supplied to the LED 18. The aging compensation logic 72 may generate a current compensation factor 214 based on the current at the LED 18. In some embodiments, the current compensation factor may be expressed as the quotient of the current 210 at the LED 18 divided by a reference current, taken to the power of a parameter. The current 210 at the LED 18 may already have had a prior compensation factor applied to it by the aging compensation logic 72.

The aging compensation logic 72 may combine the temperature compensation factor 212 and the current compensation factor 214 to determine a present compensation factor 216. In some embodiments, the present compensation factor 216 may include a product of the temperature compensation factor 212 and the current compensation factor 214. For example, the aging compensation logic 72 may generate the present compensation factor 216 by multiplying an emission duty cycle of the LED 18 by the temperature compensation factor 212 and the current compensation factor 214.

The aging compensation logic 72 may then store the present compensation factor 216 in a memory device, such as the memory device 62, along with other, previously-generated compensation factors 218. The aging compensation logic 72 may generate a compensation factor 220 to be applied to a current supplied to the LED 18 based on the present compensation factor 216 and the previous compensation factors 218. For example, the compensation factor 220 may be an average of the present compensation factor 216 and the previous compensation factors 218. In some embodiments, the aging compensation logic 72 may apply weights to the present compensation factor 216 and the previous compensation factors 218, and generate the compensation factor 220 based on the weighted compensation factors 216, 218. For example, a greater weight may be applied to the present compensation factor 216 and/or more recent previous compensation factors 218 as opposed to older previous compensation factors 218. In this manner, the aging compensation logic 72 may avoid or reduce display abnormalities, such as "burn-in" effects, resulting in better display quality.

Figure 20:
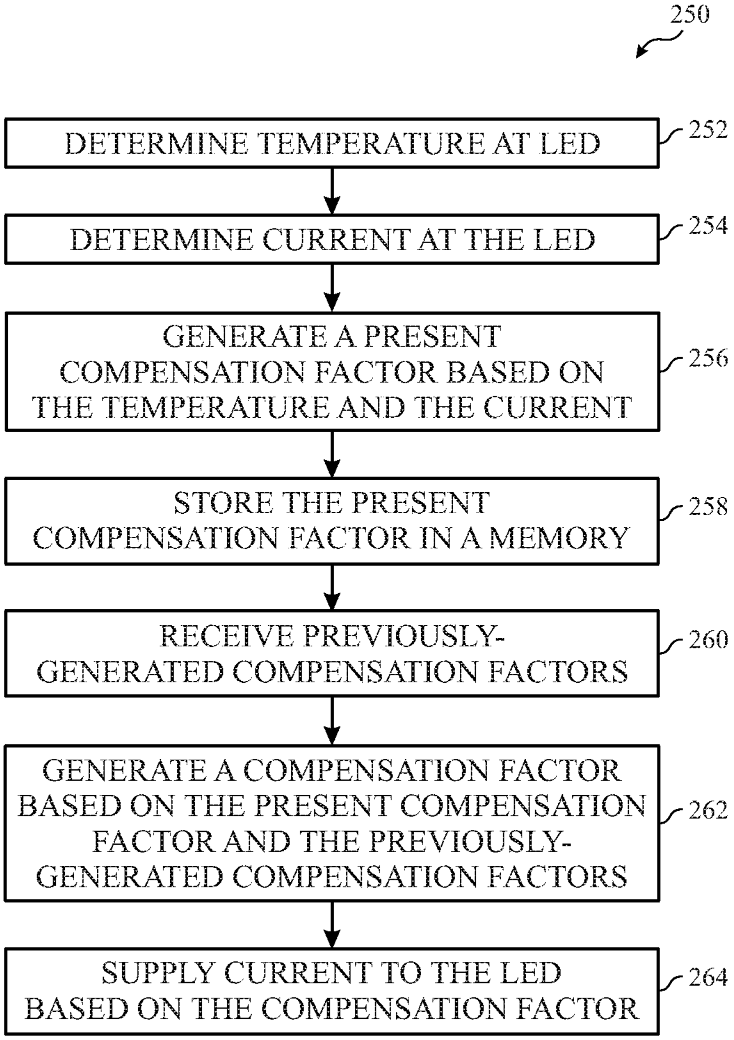
FIG. 20 is a flowchart of a method for compensating for aging of and temperature at an LED of the display of the electronic device of FIG. 1, according to embodiments of the present disclosure

With the foregoing in mind, FIG. 20 is a flowchart of a method 250 for compensating for aging of and temperature at an LED 18, according to embodiments of the present disclosure. It is noted that, although depicted in a particular order, the blocks of the method 250 may be performed in any suitable order, and at least some blocks may be skipped altogether. As described herein, the method 250 is described as performed by the aging compensation logic 72 and the backlight control system 21, however, it should be understood that any suitable processing and/or control circuitry may perform some or all of the operations of the method 250, such as the processor 60 and/or the processor core complex 12, based on executing instructions stored in a memory device, such as the memory device 62 and/or the memory device 13.

At block 252, the aging compensation logic 72 receives or determines the temperature 88 at the LED 18. In some embodiments, the temperature 88 may be measured using a temperature sensor at the LED 18 or estimated based on current at the LED 18. In additional or alternative embodiments, the temperature 88 may be calculated using a temperature grid or table. The aging compensation logic 72 may generate a temperature compensation factor 212 based on the temperature of the LED 18. In some embodiments, the temperature compensation factor 212 may be expressed as a calibrated parameter taken to the power of the quotient of the difference between a reference temperature and the temperature 88 of the LED 18 divided by a constant value.

At block 254, the aging compensation logic 72 receives or determines the current 210 at the LED 18. The current 210 may be measured using a current sensor at the LED 18 or estimated based on current supplied to the LED 18. The aging compensation logic 72 may generate a current compensation factor 214 based on the current at the LED 18. In some embodiments, the current compensation factor may be expressed as the quotient of the current 210 at the LED 18 divided by a reference current, taken to the power of a parameter.

At block 256, the aging compensation logic 72 generates a present compensation factor 216 based on the temperature 88 and the current 210. In particular, the aging compensation logic 72 may combine the temperature compensation factor 212 and the current compensation factor 214 to generate the present compensation factor 216. In some embodiments, the present compensation factor 216 may include a product of the temperature compensation factor 212 and the current compensation factor 214. For example, the aging compensation logic 72 may generate the present compensation factor 216 by multiplying an emission duty cycle of the LED 18 by the temperature compensation factor 212 and the current compensation factor 214.

At block 258, the aging compensation logic 72 stores the present compensation factor 216 in a memory device, such as the memory device 62. At block 260, the aging compensation logic 72 receives previously-generated compensation factors 218 from the memory device.

At block 262, the aging compensation logic 72 generates a compensation factor 220 to be applied to a current supplied to the LED 18 based on the present compensation factor 216 and the previous compensation factors 218. For example, the aging compensation logic 72 may average the present compensation factor 216 and the previous compensation factors 218 to generate the compensation factor 220. In some embodiments, the aging compensation logic 72 may apply weights to the present compensation factor 216 and the previous compensation factors 218, and generate the compensation factor 220 based on the weighted compensation factors 216, 218.

At block 264, the backlight control system 21 supplies current to the LED 18 based on the compensation factor 220. In particular, the backlight control system 21 may apply the compensation factor 220 to the current (e.g., by multiplying the current by the compensation factor 220), and supply that current to the LED 18. In this manner, the method 250 may avoid or reduce display abnormalities, such as "burn-in" effects, resulting in better display quality.

It should be understood that any or all of the disclosed logic and/or methods may be combined together. That is, the electronic device 10 may include any combination of the sloping logic 64, the power limiting logic 66, the adaptive headroom logic 68, the backlight interrupt logic 70, and the aging compensation logic 72. Moreover, the electronic device 10 may perform any combination of the methods 100, 130, 160, 190, and 250.

The specific embodiments described above have been shown by way of example, and it should be understood that these embodiments may be susceptible to various modifications and alternative forms. It should be further understood that the claims are not intended to be limited to the particular forms disclosed, but rather to cover all modifications, equivalents, and alternatives falling within the spirit and scope of this disclosure.

The techniques presented and claimed herein are referenced and applied to material objects and concrete examples of a practical nature that demonstrably improve the present technical field and, as such, are not abstract, intangible or purely theoretical. Further, if any claims appended to the end of this specification contain one or more elements designated as "means for [perform]ing [a function] . . . " or "step for [perform]ing [a function] . . . ", it is intended that such elements are to be interpreted under 35 U.S.C. 112(f). However, for any claims containing elements designated in any other manner, it is intended that such elements are not to be interpreted under 35 U.S.C. 112(f).

What is claimed is:

1. An electronic display device comprising:

a liquid crystal display panel;

a backlight comprising a plurality of light-emitting diodes configured to emit light through the liquid crystal display panel; and one or more processors configured to:

receive an indication that image data is to be written to one or more pixels of the liquid crystal display panel;

send an interrupt, via a controller of the liquid crystal display panel, to the backlight to prevent updating one or more light-emitting diodes of the plurality of light-emitting diodes, wherein the one or more light-emitting diodes corresponds to the one or more pixels of the liquid crystal display panel;

cancel the interrupt, via the controller of the liquid crystal display panel, after one or more pixel values are written to the one or more pixels of the liquid crystal display panel and the one or more pixels have settled; and in response to cancelling the interrupt, update the one or more light-emitting diodes corresponding to the one or more pixels based on the one or more pixel values.

2. The electronic display device of claim 1, wherein the one or more processors is configured to cancel the interrupt after determining that voltages of the one or more pixels settle after writing the one or more pixel values.

3. The electronic display device of claim 2, wherein determining that the voltages of the one or more pixels have settled comprises determining that the voltages have remained constant for a threshold duration of time.

4. The electronic display device of claim 2, wherein determining that the voltages of the one or more pixels have settled comprises determining that the voltages have remained within a threshold range for a threshold duration of time.

5. The electronic display device of claim 2, comprising one or more voltage sensors configured to monitor the voltages of the one or more pixels, wherein determining that the voltages of the one or more pixels have settled is based at least in part on measurements of the one or more voltage sensors.

6. The electronic display device of claim 2, wherein determining that the voltages of the one or more pixels have settled continues until the voltages of the one or more pixels have settled.

7. The electronic display device of claim 1, wherein updating the one or more light-emitting diodes comprises the one or more processors being configured to:

determine a transition curve between a present brightness and a target brightness; and interpolate, on the transition curve, a sloped brightness for the plurality of light-emitting diodes based at least in part on the present brightness, the target brightness, and a temperature of the plurality of light-emitting diodes.

8. The electronic display device of claim 1, wherein updating the one or more light-emitting diodes comprises:

determining a current to supply to the one or more light-emitting diodes of the plurality of light-emitting diodes;

determining a reduced voltage level to supply to the one or more light-emitting diodes based on the current of the one or more light-emitting diodes; and supplying the current and the reduced voltage level to the one or more light-emitting diodes, wherein the reduced voltage level is less than a uniform voltage used for other light-emitting diodes of the plurality of light-emitting diodes and is greater than a minimum voltage of the one or more light-emitting diodes of the plurality of light-emitting diodes.

9. A method comprising:

receiving, at one or more processors, an indication of a new image frame comprising one or more pixel values to be written to one or more pixels of a liquid crystal display panel; and in response to receiving the indication of the new image frame:

sending an interrupt, via a controller of the liquid crystal display panel, to prevent updating one or more light-emitting diodes of a plurality of light-emitting diodes, wherein the one or more light-emitting diodes corresponds to the one or more pixels of the liquid crystal display panel;

cancelling the interrupt, via the controller of the liquid crystal display panel, after the one or more pixel values are written to the one or more pixels of the liquid crystal display panel and the one or more pixels have settled; and in response to cancelling the interrupt, updating the one or more light-emitting diodes corresponding to the one or more pixels based on the one or more pixel values.

10. The method of claim 9, wherein cancelling the interrupt after the one or more pixel values are written to the one or more pixels of the liquid crystal display panel comprises cancelling the interrupt after determining that voltages of the one or more pixels settle after writing the one or more pixel values.

11. The method of claim 10, wherein determining that the voltages of the one or more pixels have settled comprises determining that the voltages have remained constant for a threshold duration of time.

12. The method of claim 10, wherein determining that the voltages of the one or more pixels have settled comprises determining that the voltages have remained within a threshold range for a threshold duration of time.

13. The method of claim 10, wherein determining that the voltages of the one or more pixels have settled comprises receiving one or more voltage measurements from one or more voltage sensors, and determining that the voltages of the one or more pixels have settled is based at least in part on measurements of the one or more voltage sensors.

14. The method of claim 9, wherein updating the one or more light-emitting diodes comprises:

receiving a target brightness for the plurality of light-emitting diodes; and determining a transition curve between a present brightness and the target brightness.

15. The method of claim 14, comprising interpolating, on the transition curve, a sloped brightness for the plurality of light-emitting diodes based at least in part on the present brightness, the target brightness, and a temperature of the plurality of light-emitting diodes.

16. The method of claim 15, wherein updating the one or more light-emitting diodes comprises:

determining a current to supply to the one or more light-emitting diodes of the plurality of light-emitting diodes;

determining a reduced voltage level to supply to the one or more light-emitting diodes based on the current of the one or more light-emitting diodes; and supplying the current and the reduced voltage level to the one or more light-emitting diodes, wherein the reduced voltage level is less than a uniform voltage used for other light-emitting diodes of the plurality of light-emitting diodes and is greater than a minimum voltage of the one or more light-emitting diodes of the plurality of light-emitting diodes.

17. One or more tangible, non-transitory, computer-readable media, comprising instructions that, when executed by one or more processors, cause the one or more processors to:

receive, at the one or more processors, an indication of a new image frame comprising one or more pixel values to be written to one or more pixels of a liquid crystal display panel; and in response to receiving the indication of the new image frame:

send an interrupt to prevent updating one or more light-emitting diodes of a plurality of light-emitting diodes, wherein the one or more light-emitting diodes corresponds to the one or more pixels of the liquid crystal display panel;

cancel the interrupt after the one or more pixel values are written to the one or more pixels of the liquid crystal display panel and the one or more pixels have settled; and in response to cancelling the interrupt, update the one or more light-emitting diodes corresponding to the one or more pixels based on the one or more pixel values.

18. The one or more tangible, non-transitory, computer-readable media of claim 17, wherein cancelling the interrupt after the one or more pixel values are written to the one or more pixels of the liquid crystal display panel comprises cancelling the interrupt after determining that voltages of the one or more pixels settle after writing the one or more pixel values.

19. The one or more tangible, non-transitory, computer-readable media of claim 18, wherein determining that the voltages of the one or more pixels have settled comprises determining that the voltages have remained within a threshold range for a threshold duration of time.

20. The one or more tangible, non-transitory, computer-readable media of claim 18, wherein determining that the voltages of the one or more pixels have settled comprises receiving one or more voltage measurements from one or more voltage sensors, and determining that the voltages of the one or more pixels have settled is based at least in part on measurements of the one or more voltage sensors.

* * * * *